United States Patent
Berg et al.

(10) Patent No.: US 11,140,166 B2
(45) Date of Patent: Oct. 5, 2021

(54) MULTI-TENANT AUTHORIZATION

(71) Applicant: Uptake Technologies, Inc., Chicago, IL (US)

(72) Inventors: John Berg, Westmont, IL (US); James Ferrans, Wheaton, IL (US)

(73) Assignee: Uptake Technologies, Inc., Chicago, IL (US)

( * ) Notice: Subject to any disclaimer, the term of this patent is extended or adjusted under 35 U.S.C. 154(b) by 287 days.

(21) Appl. No.: 16/264,086

(22) Filed: Jan. 31, 2019

(65) Prior Publication Data
US 2020/0120098 A1 Apr. 16, 2020

Related U.S. Application Data

(60) Provisional application No. 62/745,854, filed on Oct. 15, 2018.

(51) Int. Cl.
*H04L 29/06* (2006.01)
*G06F 21/62* (2013.01)

(52) U.S. Cl.
CPC ........ *H04L 63/101* (2013.01); *G06F 21/6218* (2013.01); *H04L 63/104* (2013.01); *G06F 2221/2141* (2013.01)

(58) Field of Classification Search
None
See application file for complete search history.

(56) References Cited

U.S. PATENT DOCUMENTS

| 7,107,610 | B2 | 9/2006 | Lortz |
| 8,978,122 | B1 | 3/2015 | Zolfonoon et al. |
| 9,774,586 | B1 * | 9/2017 | Roche ................. G06F 21/6218 |
| 9,853,993 | B1 | 12/2017 | Zhou |
| 2003/0084069 | A1 | 5/2003 | Boreham et al. |
| 2008/0016580 | A1 | 1/2008 | Dixit et al. |

(Continued)

OTHER PUBLICATIONS

Calero et al. Toward a Multi-Tenancy Authorization System for Cloud Services. Security & Privacy, IEEE, Nov. 1, 2010, pp. 1-7. [online]. [retrieved on Mar. 20, 2020]. Retrieved from the Internet <URL:https://www.researchgate.net/publication/224202017_Tow.

(Continued)

*Primary Examiner* — Brandon S Hoffman
(74) *Attorney, Agent, or Firm* — Lee Sullivan Shea & Smith LLP

(57) ABSTRACT

A method for multi-tenant authorization includes receiving, from a user account of a multi-tenant computer system, a request for a resource of the multi-tenant computer system. The method further includes determining whether the resource corresponds to a local resource that is local to the user account or to a nonlocal resource that is not local to the user account. The method further includes identifying, by a processing device, a local access control policy of the user account, corresponding to the local resource, or a visiting access control policy of the user account, corresponding to the nonlocal resource. The method further includes determining that the identified access control policy of the user account comprises an access permission corresponding to the resource. The method further includes controlling access to the resource of the multi-tenant computer system based on the access permission.

20 Claims, 12 Drawing Sheets

(56) References Cited

U.S. PATENT DOCUMENTS

| | | | |
|---|---|---|---|
| 2008/0034438 A1 | 2/2008 | Mireku et al. | |
| 2009/0106207 A1 | 4/2009 | Solheim | |
| 2009/0150981 A1 | 7/2009 | Amies et al. | |
| 2009/0288136 A1 | 11/2009 | Chang et al. | |
| 2012/0060207 A1 | 3/2012 | Mardikar | |
| 2013/0007891 A1* | 1/2013 | Mogaki | H04L 63/104 726/27 |
| 2013/0283340 A1 | 10/2013 | Biswas et al. | |
| 2013/0283350 A1 | 10/2013 | Afek | |
| 2014/0115005 A1 | 4/2014 | Week | |
| 2015/0101014 A1 | 4/2015 | Giambiagi et al. | |
| 2016/0072814 A1 | 3/2016 | Martinelli | |
| 2016/0246983 A1 | 8/2016 | Rissanen et al. | |
| 2016/0267413 A1 | 9/2016 | Liang | |
| 2016/0357869 A1 | 12/2016 | Hang | |
| 2017/0134242 A1 | 5/2017 | Ridl | |
| 2017/0223138 A1 | 8/2017 | Amiri | |
| 2017/0339148 A1 | 11/2017 | Syomichev et al. | |
| 2018/0124031 A1 | 5/2018 | Krishnaprasad | |
| 2018/0268159 A1 | 9/2018 | Yu | |
| 2019/0050476 A1 | 2/2019 | Florentino | |
| 2019/0364051 A1 | 11/2019 | Ferrans | |

OTHER PUBLICATIONS

International Searching Authority International Search Report and Written Opinion for PCT/US2019/054448, dated Jan. 8, 2020, 15 pages.

Tang et al. A multi-tenant RBAC model for collaborative cloud services. 2013 Eleventh Annual Conference on Privacy, Security and Trust, IEEE, Jul. 10, 2013, pp. 229-238. [online], [retrieved on Mar. 20, 2020]. Retrieved from the Internet <URL:https://www.profsandhu.com/cs6393_s16/Tang-etal-2013b.pdf>.

Ranjbar, Alireza. Domain Isolation in a Multi-Tenant Software-Defined Network. Aalto University, Finland, Dec. 2015, 10 pages. [online], [retrieved on Mar. 20, 2020]. Retrieved from the Internet <URL: http://www.cs.hut.fi/~antikam1/domainIsolation.pdf>.

Ranjbar, Alireza. Domain Isolation in a Multi-Tenant Software-Defined Network. AALTO University: School of Electrical Engineering. Thesis submitted for degree of Master of Science in Technology. Apr. 15, 2015 107 pages.[online], [retrieved on Mar. 20, 2020]. Retrieved from the Internet <URL:https://core.ac.uk/download/pdf/80715216.pdf>.

Tang et al. Multi-Tenancy Authorization Models for Collaborative Cloud Services. Collaboration Technologies and Systems, 2013 International Conference on, IEEE, May 20, 2013, pp. 132-138. [online], [retrieved on Mar. 20, 2020]. Retrieved from the Internet <URL:https://ieeexplore.ieee.org/document/6567218>.

Calero et al. Toward a Multi-Tenancy Authorization System for Cloud Services. Security & Privacy, IEEE, Nov. 1, 2010, pp. 48-55. [online]. [retrieved on Mar. 20, 2020]. Retrieved from the Internet <URL:https://s3.amazonaws.com/academia.edu.documents/45820841/msp.2010.19420160520-7567-107jwuv.pdf>.

Chen Zhen et al. Query rewritting in spatial database for access control, Computing for Geospatial Research & Applications ACM 2 Penn Plaze Suite 701 New York 10121-0701 USA May 23, 2011 (May 23, 2011) pp. 1-4.

* cited by examiner

MULTI-TENANT AUTHORIZATION

CROSS-REFERENCE TO RELATED APPLICATIONS

This application claims the benefit of U.S. Provisional Patent Application No. 62/745,854, filed Oct. 15, 2018, the entire contents of which is hereby incorporated by reference.

TECHNICAL FIELD

Aspects of the present disclosure relate to access control systems, and more particularly, to a multi-tenant authorization.

BACKGROUND

In general, access control systems allow for the authentication, authorization, and/or audit of client devices and user credentials. In an access control system, the entities that can perform actions on the system are called subjects, and the entities representing resources to which access may need to be controlled are called objects. Subjects and objects may both be considered as software entities. Identification and authentication ensure that only legitimate subjects can log on to a system while authorization specifies what a subject can do on the system. Access approval via an access control system grants access during operations, by association of users (e.g., in a multi-tenant computer system) with the resources that they are allowed to access, based on the authorization policy. Authentication methods and tokens include passwords, biometric scans, physical keys, electronic keys and devices, hidden paths, social barriers, and monitoring by humans and automated systems.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
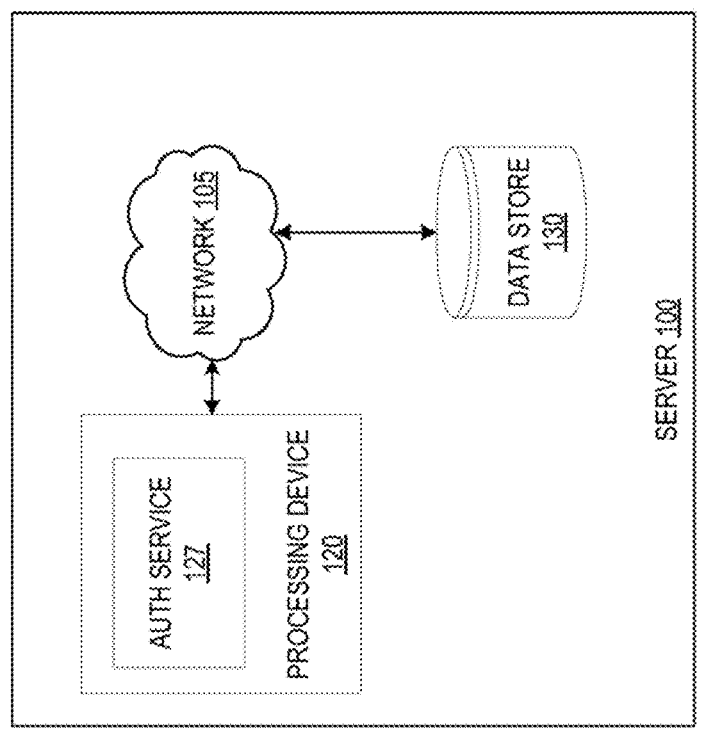
FIG. 1 is a block diagram that illustrates an example access control system, in accordance with some embodiments of the present disclosure.

In general, each access control system supports a policy governing what permissions each user of the system has. Permissions may involve an action on a resource (possibly composed of many smaller resources). For example, one user could be granted a permission to "read" all records in a table of a relational database, while another could be granted a permission to "read", "create", "update," and "delete" those records. The range of actions and resources is unbounded and very general: they can be virtual or physical, coarse- or fine-grained, etc.

A variety of access control methodologies exists. Role-based access control (RBAC) introduces a third entity between users and permissions: roles. A role may be an aggregation of zero or more permissions (each an action on a resource), and it is given a descriptive name like "Database Reader" or "Loan Approver." Permissions may be granted to roles and revoked from them. Users may be placed in roles and removed from them. RBAC can grow increasingly complicated when there are many users and many resources, and access to those resources does not follow a regular pattern. Another access control methodology is attribute-based access control (ABAC).

In an ABAC system, when a user requests access to a resource, the ABAC system makes an access control decision based on a policy defined in terms of attributes (name/value pairs). Attributes describe the user, the resource, and the environment (or context) of the access control decision (things like the time of day, day of week, physical location of the user as determined by IP address, etc.). For example, a user might be granted access to a patient's medical record if (a) the user has the job title "MD" or "Registered Nurse", and (b) the medical record includes a signed privacy agreement. Like the RBAC system, the ABAC can grow increasingly complicated when there are many users and many resources, and access to those resources does not follow a regular pattern. In some embodiments, RBAC systems may pay an increased upfront setup overhead for eased administration and auditability compared to ABAC systems, since in ABAC systems it can become unclear which attributes are needed to access a particular resource, and which users had a particular set of attributes at a particular point in time when a resource was accessed.

Furthermore, with respect to multi-tenant computer systems, multi-tenant authorization (e.g., multi-tenant access control) may include the process of (1) defining an access control policy that determines what actions each user of a system is allowed to make on one or more resources, and then (2) enforcing that policy. In one embodiment, as described herein, a multi-tenant architecture may be multi-tenant computer system that supports many tenants. Such a system may enforce the tenant isolation principle, so that users in one tenant cannot see or access anything belonging to another tenant, or even be able to detect the presence of other tenants. Some multi-tenant architectures may provide a uniform feature set to all tenants. Others may allow a high-degree of per-tenant customization. Others may fall between these extremes.

In one embodiment, a multi-tenant computer system may be viewed as having a set of tenant-initiated activities and a set of platform-initiated activities. In some embodiments, the more customization allowed by the system, the more tenant-initiated activities there may be. In one embodiment, an example of a platform-initiated activity in a cloud-based storage system may include reading all tenant files in order to make backup copies of them. Various current embodiments of multi-tenant authorization are focused on controlling the access of tenant activities, while platform-initiated activities are fully trusted to do anything.

In various embodiments, there may exist cases in which the same user should be allowed to access multiple tenants. In various embodiments, a user in such cases may be invited into each tenant by a tenant administrator, and then provisioned with roles and/or permissions in that tenant. Such embodiments are by invitation only, and each tenant has full autonomy. The above embodiments may present a variety of inefficiencies in a multi-tenant computer system. For example, having to authorize individual user accounts via invitation is cumbersome and time consuming, and as a result taxes system resources. Additionally, because users may have separate accounts per tenant, it may be difficult to audit users' overall access across tenants. Furthermore, once granted access, platform-initiated activities may be fully trusted to do anything, and the chance of them performing some detrimental action may be increased. Further still, the above embodiments may need to be designed and written to handle two different states one state when the system is interacting with, or performing a service on behalf of, a user of a tenant, and another state when the system is performing a platform-level service. Two sets of software and/or hardware may be required to maintain both states, which may be both spatially and functionally inefficient.

The embodiments described herein overcome the above, and other deficiencies to computer systems by providing for a single, multi-tenant authorization platform that is capable of performing both tenant-level activities and platform-level activities in a more efficient manner than previously possible. In one embodiment, the systems and methods described herein advantageously apply the same access control mechanisms to vendor- (e.g., platform-) initiated activities as are applied to tenant-specific activities. It is possible that a further embodiment may also allow a tenant to invite another tenant's users to come in and access its resources.

In another embodiment, the system described herein allows platform-initiated activities to both be properly authenticated with a user account and access many tenants, without the consent of those tenants. In one embodiment, there is a special, distinguished tenant called the "root tenant," which contains the user accounts (e.g., "root user accounts") used by platform-initiated activities, and which contains the access control policies for those user accounts.

In one embodiment, a user belonging to the root tenant can have two or more access control policies. One is a normal policy applied when that user is operating locally on resources owned by the root tenant. The other is a visiting policy that may be applied when the root user is making a tenant visit and operating on resources owned by an ordinary (e.g., non-root) tenant. In one embodiment, the normal (e.g., local) access control policy of a root user is consulted when that user is attempting to make a tenant visit. Only if that policy grants the right to visit that particular tenant can the visit be made. Advantageously, this may mitigate or eliminate a requirement to receive, by a first tenant, explicit permission by a second tenant to access (e.g., by the first tenant) the second tenant's resources. For example, in one embodiment, root tenant users are able to go into another tenant and do what they like with that tenant's resources, without receiving an explicit invitation to do so.

In one embodiment, the embodiments described herein include the notion of a single special "root tenant," some of whose users are granted the rights to visit non-root tenants. When these users are visiting, they have an access control policy that's defined in the root tenant. Other embodiments may include a tree of tenants, with a root tenant whose users can visit any other tenant, plus intermediate tenants who can visit subsets of other tenants. In an illustrative example, one tenant's company has bought three other tenants' companies, and the combined entity wants to allow one of its tenants to visit the other three.

FIG. 1 is a block diagram that illustrates an example access control system 101, in accordance with some embodiments of the present disclosure. In one embodiment, access control system functionality may be provided by a server 100. Server 100 may include various components, which may allow an access control system application to run on a server device. Each component may perform different functions, operations, actions, processes, methods, etc., for an access control system and/or may provide different services, functionalities, and/or resources for the access control system.

Different components of system 101 may be located on and/or may execute on different processing devices (e.g., processing device 120) of the server 100, as discussed in more detail below. In one embodiment, auth (authentication and/or authorization) service 127 may be implemented on processing device 120 of server 100. In one embodiment, auth service 127 performs hybrid role and attribute based access control system operations. In another embodiment, auth service 127 performs role, attribute, and/or organization based access control system operations.

As illustrated in FIG. 1, server 100 includes a computing processing device 120, a data store 130, and a network 105. The processing device 120 and the data store 130 are coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a wireless local area network (WLAN) (e.g., WiFi®) hotspot connected with the network 105 and/or a wireless carrier system that can be implemented using various data processing equipment, communication towers (e.g. cell towers), etc. The network 105 may carry communications (e.g., data, message, packets, frames, etc.) between the various components of server 100. The data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The servers 100, 103 may comprise any suitable type of computing device or machine that has a programmable processor including, for example, server computers, desktop computers, laptop computers, tablet computers, smartphones, set-top boxes, etc. In some examples, the server 100 may comprise a single machine or may include multiple interconnected machines (e.g., multiple servers configured in a cluster). The server 100 may be implemented by a common entity/organization or may be implemented by different entities/organizations. For example, a server 100 may be operated by a first company/corporation and a second server (not pictured) may be operated by a second company/corporation. Each server may execute or include an operating system (OS), as discussed in more detail below. The OS of a server may manage the execution of other components (e.g., software, applications, etc.) and/or may manage access to the hardware (e.g., processors, memory, storage devices etc.) of the computing device. Further implementation details of the operations performed by server 100 are described with respect to FIGS. 2-12.

Figure 2:
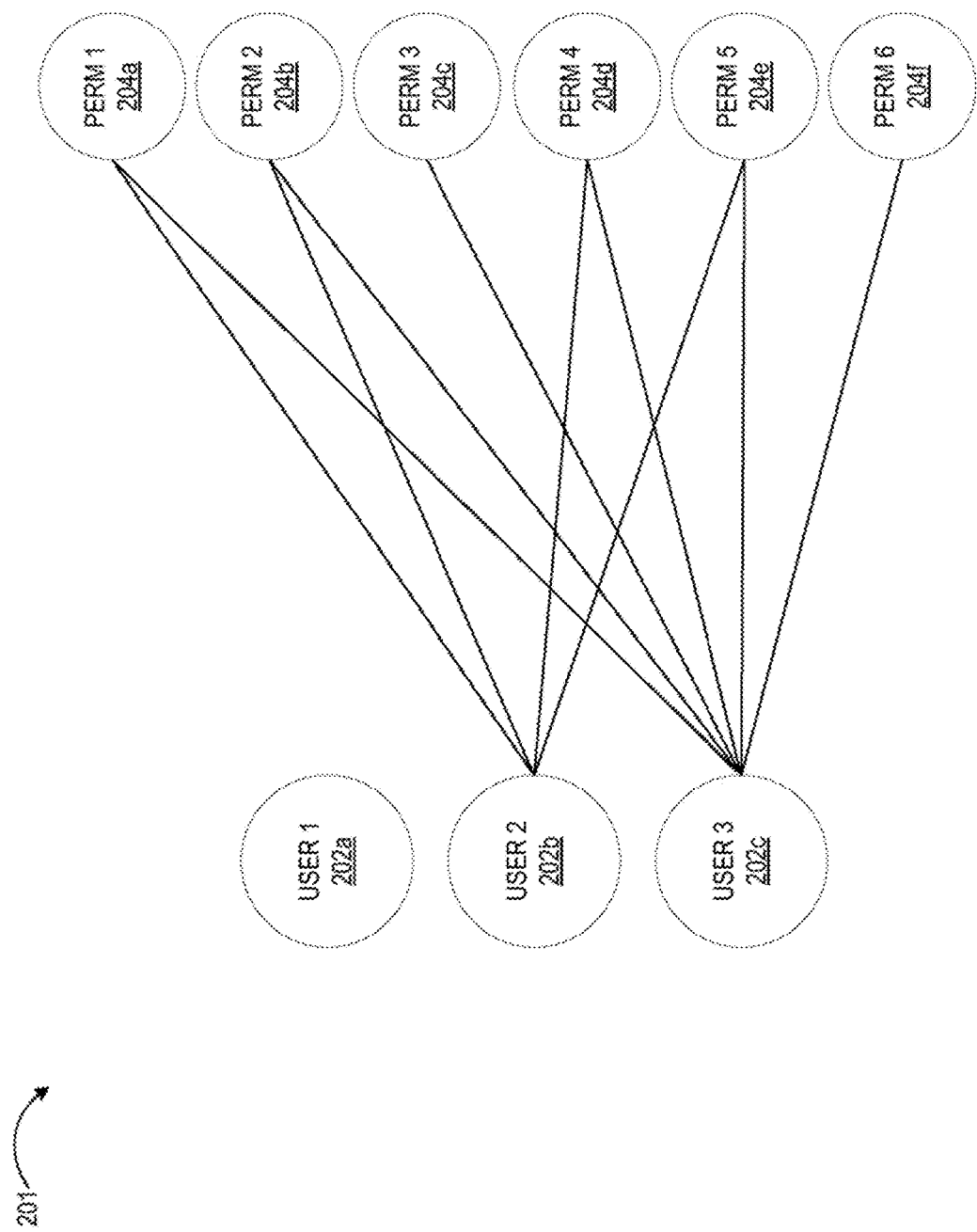
FIG. 2 is a block diagram that illustrates an example policy graph without roles, in accordance with some embodiments of the present disclosure.

FIG. 2 is a block diagram that illustrates an example policy graph 201 without roles, in accordance with some embodiments of the present disclosure. In one embodiment, a role-based access control system (or any other type of access control system, such as one based on access control lists) provides authorization to perform particular actions by particular people or client devices. In other words, authorization (e.g., access control) is a process that determines whether an authenticated user has the right to perform some requested action (e.g., "Get") on a given resource (e.g., a particular web service endpoint). For example, an access control system may provide responses to questions of the form: "Can subject S perform action A on resource R?" Some examples, of these types of questions include: Can Bob read document /db/es/orders/123?; Can Alice do a GET on web service endpoint/service/auth/users?; Can Alice see user interface control /ui/wiki/page list/add_page?; and Can service account NBSSVC01 update the database table /dbiorders_dbicustomer_schema/address? To provide responses to such questions, the access control system may be configured with a set of rules. This set of rules may be known as an access control policy. The policy may be sliced into smaller chunks, such as the policy for a particular user or the policy for a given web service API.

In one embodiment, a permission may be a grouping of an action and a resource. For example, "read document /db/es/orders/123" may be considered a permission with "read" being the action and "document /db/es/orders/123" being the resource. Accounting for permissions, an access control system may provide responses to queries such as, Does Bob have the permission "read document /db/es/orders/123" ?; and Does Alice have the permission "get endpoint /service/auth/users" ? Thus, in one embodiment, a policy may be a group of permissions.

In one embodiment, if the rules forming an access control policy are too specific then a large number of rules may be required to be maintained. Disadvantageously, the policy may become harder to maintain as rules continue to be added. Auditing such a policy may also prove difficult and time consuming. In one embodiment, such a policy may include many very specific rules of the form: Subject S has permission to perform action A on resource R. Whenever a new user is added to the policy, then the policy administrator has to create a rule for every permission with which the user should be entitled. Likewise, whenever a user is dropped from the policy, the administrator has to delete the permissions of that user. In one embodiment, a policy graph representing such a policy may appear similar to policy graph 201 in FIG. 2. In policy graph 201, Permissions 204*a-f* are assigned to Users 202*a-c*, according to individual authorization allowances. For example, as shown, User 1 202*a* is not assigned any Permissions 204*a-f* and therefore is not authorized to perform any actions in the system. User 2 202*b* is assigned Permissions 1, 2, 4, and 5 (204*a*, 204*b*, 204*d*, and 204*c*, respectively), while User 3 202*c* is assigned each of the Permissions 204*a-f*, allowing each user to perform actions corresponding to their respective permissions.

In one embodiment, real-world policies may be orders of magnitude more complex than that shown in policy 201. Even if there were just a hundred users and a thousand resources, and each user had access to 200 resources on average, the policy graph would have 20,000 edges. The policy administrator would have a difficult time managing the connections and adding and deleting users and resources. The administrator may make mistakes and be swamped with access control issues. The security auditor may have a difficult time determining who has which permissions. Therefore, an access control system may be more efficient using fewer abstract, universal rules instead of many concrete, specific ones.

Figure 3:
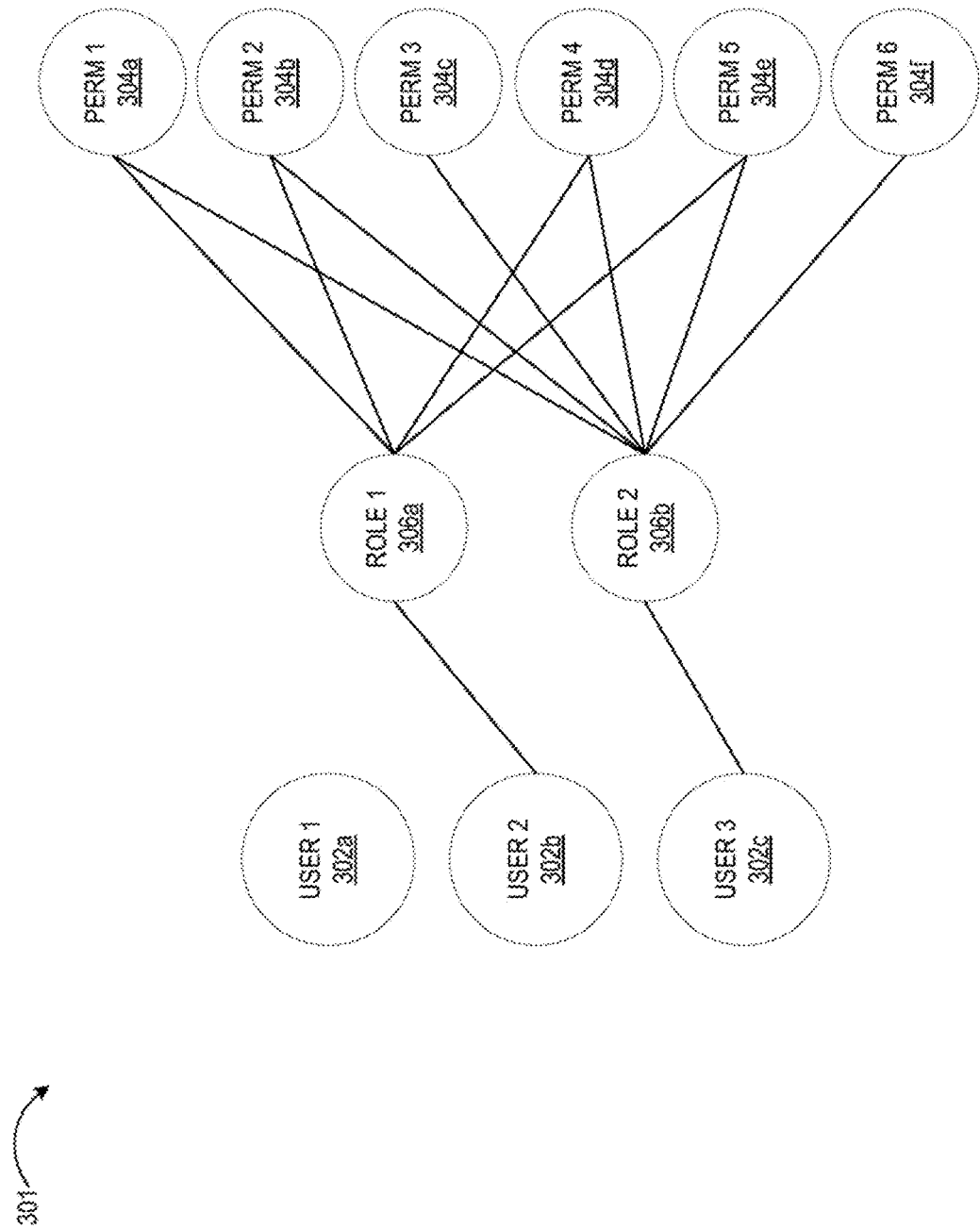
FIG. 3 is a block diagram that illustrates an example policy graph with flat roles, in accordance with some embodiments of the present disclosure.

FIG. 3 is a block diagram that illustrates an example policy graph 301 with flat roles, in accordance with some embodiments of the present disclosure. Advantageously, a Role-Based Access Control (RBAC) system may increase the efficiency of a system without roles, by introducing intermediate role nodes (e.g., Role 1 306*a* and Role 2 306*b*) to the policy graph 301. In one embodiment, a role is a related group of permissions. Users may be assigned to roles instead of being directly granted permissions. Adding roles the example policy 201 of FIG. 2 results in User 2 302*b* being assigned to Role 1 306*a*, and User 3 302*c* assigned to Role 2 306*b*. Each being assigned to a specific role, User 2 302*b* and User 3 302*c* may be assigned the respective Permissions 304*a*-304*f* assigned to each Role 306*a-b*. User 1 302*a* is not assigned to a role, and therefore is not assigned any of Permissions 304*a-f*.

Figure 4:
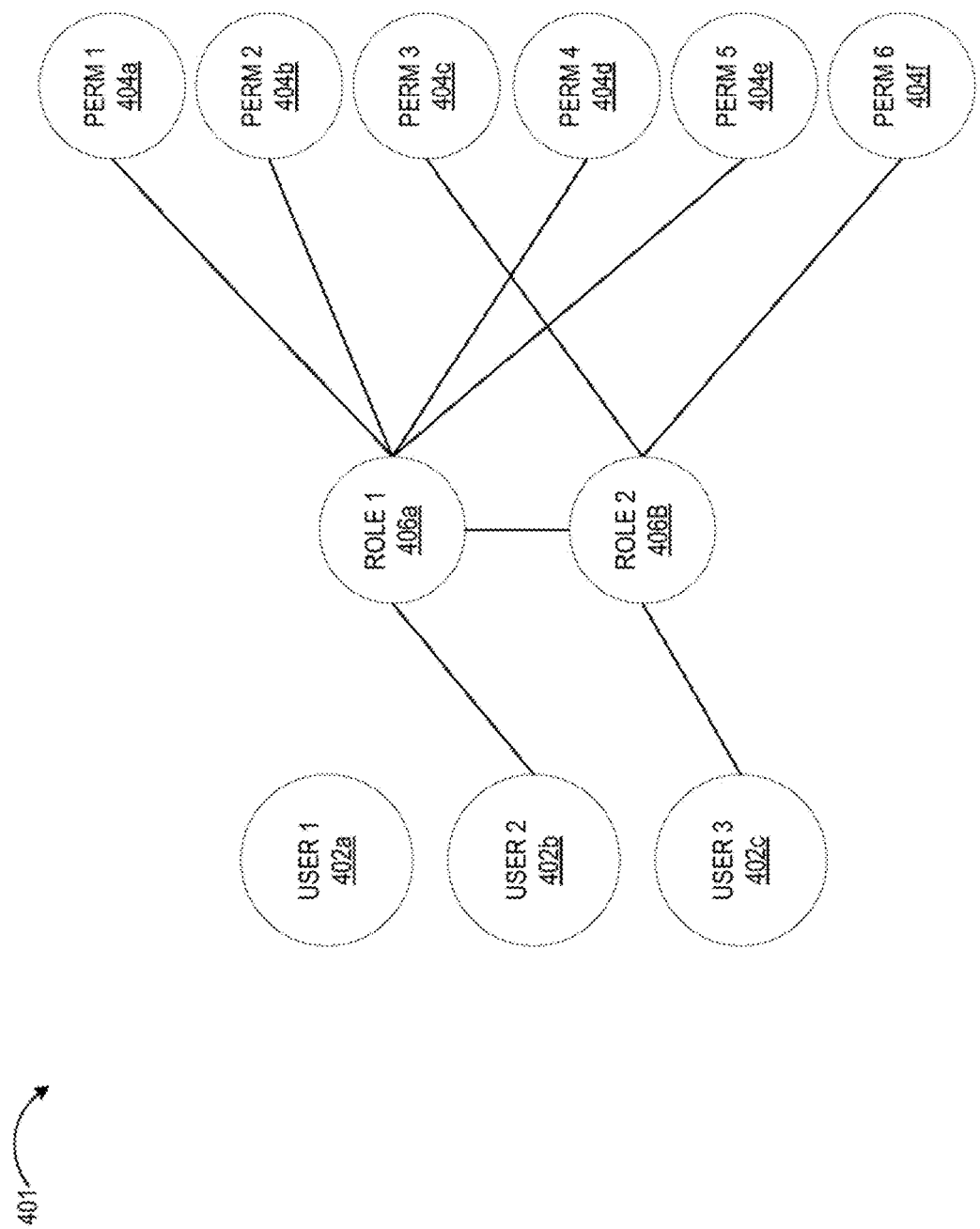
FIG. 4 is a block diagram that illustrates an example policy graph with a role hierarchy, in accordance with some embodiments of the present disclosure.

In one embodiment, if the administrator needs to add a new user with the same permissions as User 2, the access control system may add one new edge (connecting the user to Role 1 306*a*) to the graph. When User 2 leaves the company, only one edge needs deletion. An access control system supporting only one level of roles, such as that of FIG. 3, is a Flat RBAC system. Access control policies may be simplified further by introducing role hierarchies, where roles can be assigned to other roles. FIG. 4 is one example of an access control system having role hierarchies.

FIG. 4 is a block diagram that illustrates an example policy graph 401 with a role hierarchy, in accordance with some embodiments of the present disclosure. RBAC systems may include role hierarchies in a variety of ways. For example, a Restricted Hierarchical RBAC system may support a tree of roles. In another example, a General Hierarchical RBAC system supports a more general directed acyclic graph (DAG) of roles. One example of a General Hierarchical RBAC system is demonstrated by policy graph 401.

In policy graph 401, to add new permissions (e.g., Permission 1 404a, Permission 2 404b, Permission 4 404d, Permission 5 404e) for a User 3 402c (who already has Permission 3 404c and Permission 6 404f), an access control system may only have to grant that permission to Role 1 406a, and the User 3 assigned to Role 2 406B will get it automatically. User 2's 402b permissions (Permission 1 404a, Permission 2 404b, Permission 4 404d, Permission 5 404e) are maintained by the single assignment to Role 1 406a while User 1 402 still has zero permissions. Roles and hierarchies of roles can shrink a policy graph by orders of magnitude.

Role-based hierarchical access control systems may also include Constrained RBACs and Symmetric RBACs. In Constrained RBACs, users may be constrained to not have certain combinations of roles. For example, in a loan application, users might be allowed to have either the "Loan Officer" or "Loan Approver" roles, but not both at the same time, to ensure that each loan has at least two people making the decision—achieving separation of duty (SOD). These SOD constraints can be static or dynamic. In static separation of duty, a user can never have certain combinations of roles. In dynamic separation of duty, if a user has a conflicting combination, they must choose which of the conflicting roles must be inactivated to resolve the conflict.

Symmetric RBACs have backwards and forwards symmetry. In a normal RBAC, one can find out which roles and permissions a user has, but not easily discover things in the reverse direction (e.g., given a particular permission, which roles grant that permission and who has been assigned those roles). A Symmetric RBAC, as described herein, is one that makes it easy for security auditors to answer such questions.

In one embodiment, in Attribute-Based Access Control (ABAC) systems, access control policies are composed of rules that grant or revoke access to resources based on various attributes. These attributes may pertain to the user, the resource, and/or the overall context of the request. For example, if the resource is a brokerage account, an ABAC policy may grant access only to employees that: (1) have a certain job category, (2) belong to the wealth management group assigned to the account, (3) are logged in from an IP address indicating that the request is coming from within the company VPN, and (4) are making the request during ordinary business hours. In some ways, ABAC can be more flexible than RBAC.

In one embodiment, hybrid approaches melding both RBAC and ABAC can result in smaller policies. RBAC can be used to model the more static attributes, while ABAC can be used for the more dynamic ones. A variety of hybrid access control systems may be described. In one approach, dynamic roles may be implemented. For example, an activation expression may be supplied, referencing one or more attributes to each role. If this expression evaluates to true, then the role is active and the user gains all its permissions. If the expression evaluates to false, then the user does not gain those permissions.

A second approach may be defined as attribute-centric. In this approach, a user's role names are additional Boolean-valued attributes that can be referenced like any others in an ABAC system. The result of this second approach is essentially a pure ABAC system, since access is not being controlled by roles formed by collections of permissions.

A third approach may be role-centric. In this approach, permissions are granted by roles, as in RBAC, but those permissions are further constrained by rules referencing attributes. For example roles assigned to a user may grant the user ten permissions, but the user's attributes make four of the ten inactive.

A fourth approach, as described herein, may be permission-centric. In this approach, roles grant users permissions whose effects are modified by the values of attributes of the users. A data model describing this fourth approach is described in FIG. 5.

Figure 5:
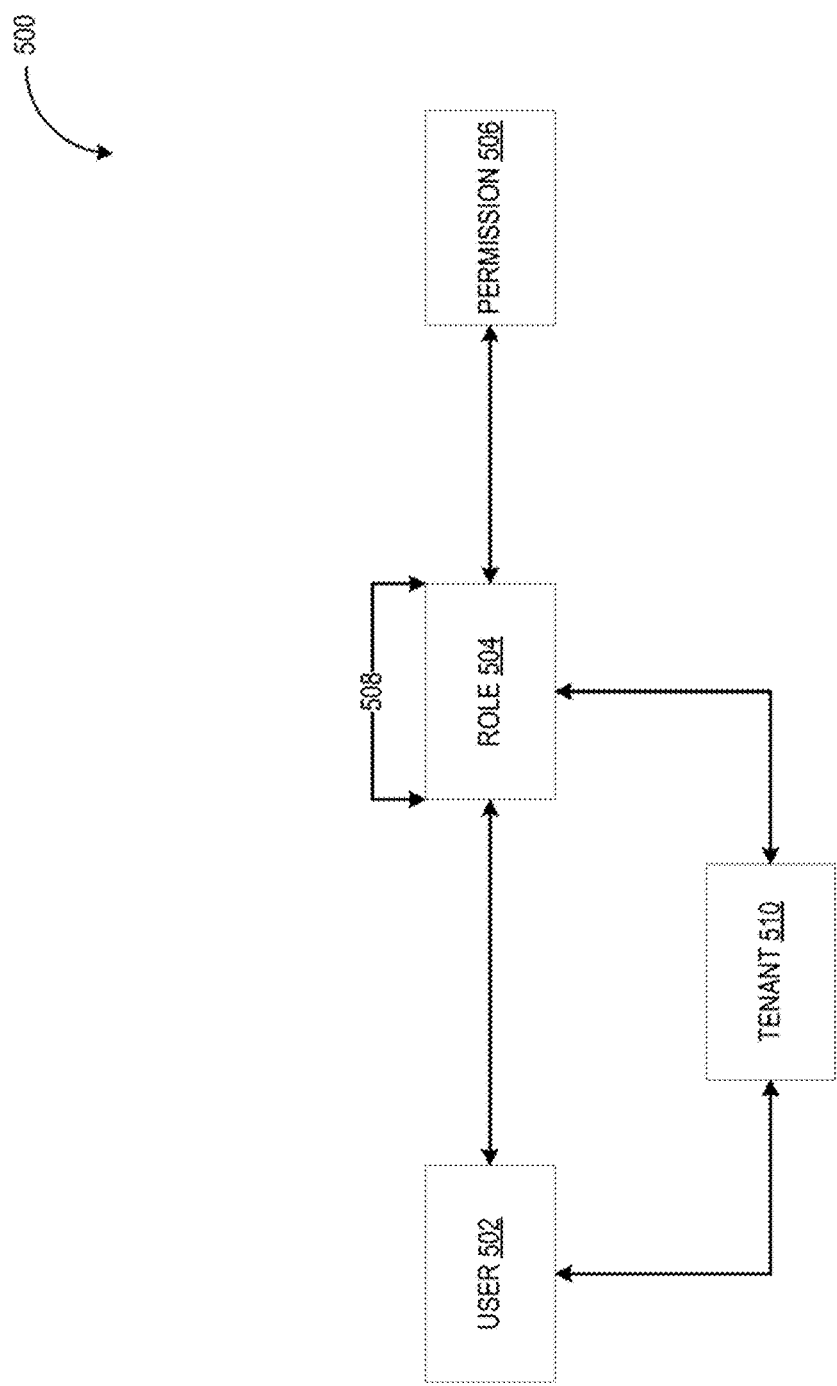
FIG. 5 is a block diagram that illustrates an example auth service data model, in accordance with some embodiments of the present disclosure.

FIG. 5 is a block diagram that illustrates an example auth service data model 500, in accordance with some embodiments of the present disclosure. As shown in model 500, Users 502 are granted Roles 504, and the Roles 504 are granted Permissions 506. In one embodiment, the relationship 508 from Role 504 back to itself is the role hierarchy relationship (e.g., roles can be granted other roles). In various embodiments described herein, organizations form tree-type structures. At the top of each tree is a special organization, called a tenant (e.g., Tenant 510). Each user (e.g., User 502) may be associated with a tenant, and an organization in their tenant's tree (which may also be the tenant itself). Each role (e.g., Role 504) may be associated with a tenant. In some embodiments, the "root" tenant described herein may be a special tenant, whose users may be authorized to visit an access resources of other tenants. It should be noted that the embodiments described herein are equally compatible with any form of multi-tenant systems e.g., the tenants do not need to be sub-divided into organizations.

In one embodiment, User 502 is the subject of access control requests. In various embodiments, the user may be a human, a service account, or some other entity. The access control system may store basic information on each user, such as, for example:

| | |
|---|---|
| id | A unique identifier key (UUID) |
| tenantId | The user's tenant's key (UUUID) |
| organizationId | The user's organization's key (UUID). |
| firstName | E.g., Abraham. |
| lastName | E.g., Lincoln |
| email | E.g., AbrahamLincoln@whitehouse.gov |
| code | A human readable identifier, as defined by the tenant. |
| locale | "en_US" (any valid locale) |
| timezone | EST (any valid timezone name) |
| isLocked | True if the User has been locked out for some reason (e.g., due to inactivity). |
| lastAuthenticatedAt | The time the User last sucessfully authenticated, or null if the User has never logged in. |

In other embodiments, the access control system may store less or more information than that described above. In one embodiment, textual fields in the access control system (e.g., displayName, firstName, lastName, email, etc.) are Unicode.

In one embodiment, each user (e.g., 502) belongs to one organization (e.g., Tenant 510). As described herein, organizations may be arranged in hierarchical trees, where the top of each organization tree is called a tenant. Tenants may have one or more sub-organizations beneath them. The access control system may store basic information on each organization, such as, for example:

| | |
|---|---|
| id | A unique identifier key (UUID). |
| code | A short organization code, e.g., "Acme." |
| name | The name of the organization, e.g., "Acme, Inc." |
| description | A description of the organization (optional). |

In one embodiment, parent/child relationships between organizations may be managed in a separate SQL closure table. Organization hierarchies of arbitrary depth are supported. The access control system described herein may be multi-tenant: it can support multiple tenant organizations at the same time, while giving each tenant the perception that it is the only tenant. Each tenant has its own users, roles, and permissions, and is rigorously isolated from every other tenant and has no way to tell if there are other tenants at all, except indirectly as a function of overall system performance. In one embodiment, there may be exceptions to this isolation. For example, in various embodiments described herein, Root tenant users can find out the precise set of tenants, go visit them, and find out everything about them. In another embodiment, other tenants may arrange visitation rights with each other, either via a "push" method (e.g., a first tenant invites a second tenant to visit, or a "pull" method (e.g., a first tenant controls a second tenant without an invitation; e.g., if one tenant's organization acquired a second tenant's organization). A tree-like arrangement of tenants where "Root" is at the top is also contemplated. A user from any tenant may push their way in and visit any tenant under it in the tree.

In one embodiment, an organization may be treated as a special kind of role. For example, if you are a member of the HR department, then you are a member of the HR role and are permitted to read all candidate interview results and comment on them. This technique can be supported in any RBAC system as is, or by adding a graphical user interface that makes some roles appear to look like organizations. In other embodiments, a command line interface and/or web service endpoint may be utilized instead of, or alongside, a graphical user interface. In another embodiment, a group may parallel a role, and can be populated automatically from a directory of employee data. In this case, when an access control policy is compiled, the group/role distinction may be erased (e.g., both behave identically).

In another embodiment, two role hierarchies may exist: a normal functional role hierarchy and an organization-specific one. Some permissions belong to the user's organizational roles, and others belong to the user's functional roles. This may be logically equivalent to a standard RBAC that supports special organization-based roles. In another embodiment, roles may be considered to be under the control of organizations, and users are granted a role in the context of its organization. If you are granted the "Doctor" role by Hospital A then you are permitted to treat patients in Hospital A, but to treat patients at Hospital B you would also have to be granted the "Doctor" role by that institution.

In yet another example, the access control system maintains an organization hierarchy separately from the role hierarchy in an organization-based access control system. In such a system, organizations are not roles, and do not contain permissions. The hierarchy can be a standard organization tree with each user belonging to exactly one organization, but embodiments also include directed acyclic graphs (DAGs) of informal organizations. For example, an enterprise can use a DAG of organizations to track both the formal organization hierarchy and informal interest groups:

Office of CEO
Marketing and Sales
Engineering
  Development
  Operations
Cost Reduction Team
Cloud Services CR Team
Facilities CR Team
Facilities Team
Facilities CR Team
Patent Team
Hardware Patents
Software Patents In the above example, a formal organization tree is rooted at the CEO, including a directed acyclic graph of ad hoc groups. The first group is an overall cost reduction team with two sub-organizations. The second is a facilities team with the facilities cost reduction team also included in it to demonstrate that organization relationships are not restricted to just a single strict hierarchy. The final team may be composed of the enterprise's patent committees (e.g., informal interest groups that may not be part of the formal organization, per se).

In one embodiment, a user does not need to belong to just one formal organization in a formal organization tree. A user may belong to exactly one organization in the formal organization tree and zero or more ad hoc groups. Someone in Operations could also be on the Cloud Services CR Team and the Software Patents team, for example. Each organization may have attributes describing it. For example, an embodiment can track each organization's unique id number, unique code, and unique name. In one embodiment, each user has a list of the organizations to which they belong. One set might refer to the single formal organization the user belongs to, while another enumerates all of the organizations of which the user is a member, both formal and ad hoc. For example, the user's formal organization's attributes could be:

orgId: 1140
orgCode: 'PAT'
orgName: 'Patent Committee'

In one embodiment, the present disclosure is not limited to attributes having simple or compound values, but generalizes to programming language expressions involving attributes. For example, an embodiment can use functions that return values to use in permissions. Instead of an organization having an attribute named subOrgCodes, the embodiment can have a function that takes an organization or orgCode or orgName and returns the list of sub-organizations, or their codes or names, etc.

In one embodiment, the current user's attributes (e.g., organization attributes) may be referred to in a resource path. For example, if there is a web service that gives access to documents managed by an organization, there could be a permission that allows all members of an organization to read that organization's documents by default.

In another embodiment, the access control system may use list-valued attributes in resource paths. Embodiments can also allow expressions of attributes to appear in resource paths. If the web service endpoint allows either an organization id, code, or name to be used interchangeably, then the user can be given access to all three of their endpoints in one permission. In another embodiment, the access control system may support built in functions in resource paths. Any use of programming language expressions attributes may be used with respect to the embodiments disclosed herein. In another embodiment, the access control system may support organizational subtree information through the use of built in functions. Any use of programming language expressions involving organization attributes and organization subtree attributes may be used with respect to the embodiments disclosed herein.

In one embodiment, permission constraint bodies can reference the current user's attributes. For example, these this permission grants access to all organization subtree documents no matter what the user's organization is:

May(Read, '/db/es', Row, '{organization: suborgNames}')

In a similar manner to the resource path above, embodiments can use any programming language expression involving attributes. In one example, suppose that some documents have a "location" field whose value is a location code, and others where the "location" field is a location name. A combined permission may look like:

May(Read, '/db/es', Row, {location: locationCodes.concat(locationNames)}')

The expression locationCodes.concat(locationNames) may produce a list including all the user's location names and their codes.

In one embodiment, in an organization-based access control system, organization hierarchies are maintained separately from roles, organizations are not treated as role-like entities, organization fields are exposed as user attributes, and organization subtree fields are exposed as list-valued user attributes. Such an organization-based access control system may be used in combination with any existing ABAC or hybrid RBAC/ABAC system, or as its own, standalone system.

An embodiment of the present disclosure may support simple attribute references without full attribute expressions. Another embodiment may only expose simple, non-list valued attributes, and not organization subtree attributes. Another embodiment may support only a standard organization tree, or it may support multiple alternative organizational hierarchies, both simpler trees and more general DAGs. In the former case the user has only a single organization, while in the latter the user has potentially many organizations.

In one embodiment, a permission (e.g., 506) consists of: an action the user may take, a resource (or set of resources) the user may take that action on, and/or an optional constraint on the action. Permissions in the access control system described herein may be purely positive: a user with no permissions at all can do nothing, while each new permission only grants the user new authorization while not removing any. Some examples of permission fields are:

| | |
|---|---|
| id | A unique identifier key (UUID). |
| roleId | The UUID of the Role the Permission belongs to. A permission may only belong to one Role. |
| domain | The Permission's "domain" type, either "Tabular" if it is a permission on some table-like resource, or "HTTP" if it is a permission on some resource that looks like a URI. |
| action | The action that is being permitted on the resource. |
| resource | The hierarchical path denoting a particular resource or subtree of resources. |
| constraintType | An optional constraint type. |
| constraintBody | An optional constraint that qualifies the action permitted on the resource. |

In various embodiments, some examples of permissions are:

| Example | Domain | Action | Resource | Constraint Type | Constraint Body |
|---|---|---|---|---|---|
| GET from endpoints starting with /service/auth/users? | HTTP | GET | /service/auth/users | n/a | n/a |
| GET a UI page? | HTTP | GET | /ui/data-viewer/home-page | n/a | n/a |
| Read all documents in index db/es/orders | Tabular | READ | /db/es/orders | ROW | { } |
| Read all fields in documents from index /db/es/orders | Tabular | READ | /db/es/orders | COLUMN | * |

In one embodiment, a user having the first permission may do GETs on all endpoints whose URIs start with "/service/auth/users." For example, in one embodiment, processing logic may take a URI similar to http://auth.example.com/v1/users/Bob, and map that to the resource /service/auth/usersiBob, then determine if the current user may access the user Bob. In this case, since Bob's resource starts with "/service/auth/users", the current user would be granted access to Bob's resource. The second permissions form a pair, and together they allow users to read all rows and all columns from a particular tabular structure.

In one embodiment, each permission has a domain (e.g., the broad family to which it belongs). In some embodiments, there are two domains. In other embodiments, any number of domains may exist. In the present example, a "Tabular" domain may be used when the resource has a tabular structure of some sort and it makes sense to control access at the row and column level. A relational database table is one example of a tabular of course, and so is a document store index. When a permission is tabular, its action may be one of the "CRUD" verbs, either "Create", "Read", "Update", or "Delete," and it may have a constraint type of "ROW" or "COLUMN". The "HTTP" domain may be used when the resource can be viewed as a unitary whole and the user is being granted permission to operate on it in its entirety. Its resource can be thought of as a URI. The permitted actions may be the HTTP verbs—"GET", "PUT", "POST", "PATCH", "DELETE", and "HEAD," and there is no constraint. In one embodiment it may seem that limiting the verbs to HTTP is too restrictive, but advantageously, because HTTP supports the REST architectural style it has a lot of expressive power. For instance, a set of UI widget permissions maybe modeled by coming up with a RESTful resource design that organizes them in a hierarchy, say by application, then page, then component hierarchy on the page. In one embodiment, granting a user the "GET" permission on a component may mean that component is enabled, otherwise it may be disabled.

In one embodiment, an Action is a verb. As discussed herein, Tabular permissions may support CRUD verbs and HTTP permissions support HTTP methods. The access control system herein does may not impose semantics on the actions (e.g., other than to limit them based on the domain type). To the access control system, actions may simply be strings.

In one embodiment, a resource of a permission may be a path string addressing some entity or aggregate entity of an application (e.g., /ui/checkout/order_review_page/buttons/one_click). Resources are described in greater detail below. In one embodiment, tabular domain permissions may be constrained as to which rows and columns may be read. The row and column constraint languages are also described in further detail below.

In one embodiment, a role includes the following fields:

| | |
|---|---|
| id | A unique identifier key (UUID) |
| name | The name of the role, e.g., "Loan Officer." |
| description | A description of the role (optional) |

In one embodiment, a role may have many permissions granted to it, and many roles granted to it. A permission may be shared by many roles, and a role may be granted to many roles.

Figure 6:
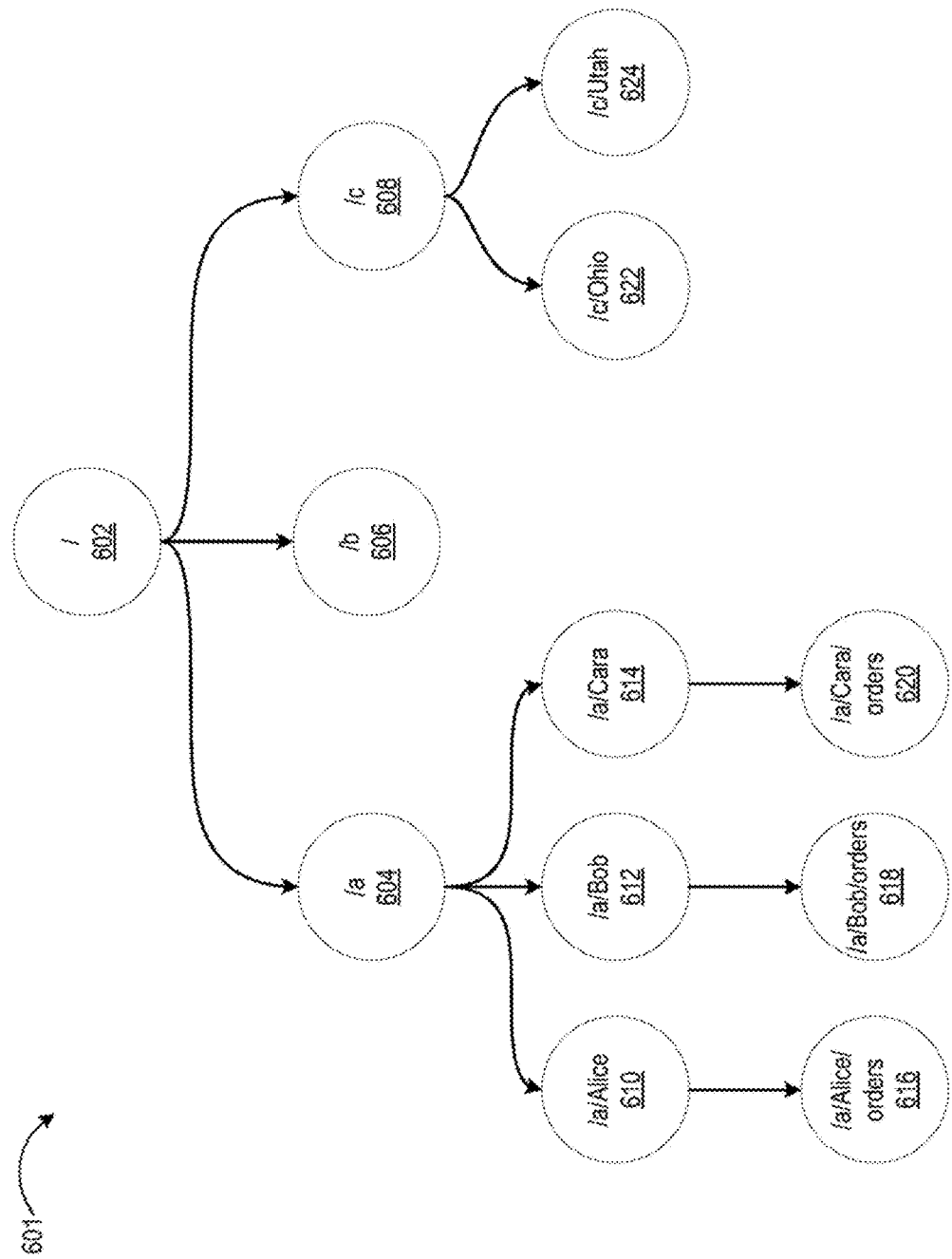
FIG. 6 is a block diagram that illustrates an example resource hierarchy, in accordance with some embodiments of the present disclosure.

FIG. 6 is a block diagram that illustrates an example resource hierarchy 601, in accordance with some embodiments of the present disclosure. In FIG. 6, example resource hierarchy 601 is shown to include nodes /602, /a 604, /b 606, /c 608, /a/Alice 610, /a/Bob 612, /a/Cara 614, /a/Alice/orders 616, /a/Bob/orders 618, /a/Cara/orders 620, /c/Ohio 622, and /c/Utah 624. In one embodiment, a resource is a slash-separated path, e.g., a Unix file name or a key in a key-value store. To the access control system described herein, a resource is simply a path. In one embodiment, resources do not have to correspond to anything concrete. Some possible resources may include: /db/es/my_index/my_document_type; /service/family/users/Bob/children/Rachel/pets/Clover; and /ui/checkout/order_review_page/buttons/one_click.

Permissions can be used to reference resources at any level of granularity. It is possible to grant access to every row and column of an entire database all at once, and it is also possible to grant access to individual table columns or particular table rows based on their unique key values. To keep policies small, expressive and efficient, the access control system described herein introduces various mechanisms for addressing groups of resources.

In one embodiment, a permission may be created that grants access to a subtree of resources instead of one permission per resource in that tree. For example, to allow a user to wear any clown nose, the access control policy may set the permission resource to /db/costume/clown/noses. Or, to enable the wearing of, any clown costume components, the access control system may set the permission resource to /db/costume/clown. Turning to the example resource hierarchy 601, to grant a permission on the subtree containing /c 608, /c/Ohio 622, and /c/Utah 624, the access control system may set the permission's resource to /c 608.

In another embodiment, the access control system described herein may utilize wildcard segments. The access control system may use wildcards in resource names, which may be especially useful for granting permissions to web service endpoints, for example. To match URI path segments containing arbitrary characters, the access control system may use the wildcard { }. For example, the access control system itself may have one endpoint for getting a user's permissions and another for getting the user's roles: (1) /users/{userId}/permissions and (2) /users/{userId}/roles. The access control system may also have endpoints for returning information on a particular user (e.g., email): /users/{userId}, another for getting pages of user information: /users, and another for getting a user's compiled policy: /users/{userId}/policy.

In one embodiment, to grant access to just the user roles endpoint without the others the access control system may use the resource: /users/{ }/roles. To make wildcard resources more descriptive the access control system can understand any text between the braces. For example, these resources are all the same: /users/{ }/roles; /users/{userId}/roles; and /users/{user UUID}/roles. Turning to example resource hierarchy 601, to select the nodes /a/Alice/orders 616, /a/Bob/orders 618, and /a/Cara/orders 620, the access control system may use /a/{userId}/orders (or just /a{ }/orders).

In another embodiment, the access control system described herein may utilize attributes. The access control system's resources and constraints can make reference to attributes of a user and the user's organization. In one example in which the access control system is to grant each user the right to see their own roles but not the roles of other users, the access control system may insert a reference to a user-specific attribute in the resource: /users/$ {userId}/roles.

When it comes time for this permission to be checked in an access control request, the string $ {userId} may be replaced by the current user's actual id value. One user would be granted access to only: /user/5e670257-bd15-4f75-91c3-5fedd02f49d1/roles, while another would be granted access to only: /users/c828d5e1-86e3-4a36-ae02-bfed02aad11b/roles. Subtree references, wildcards, and attributes allow the access control system described herein to carefully control the size of an access control policy.

In one embodiment, the total namespace containing all resources in a policy should be properly segregated to leverage subtree and wildcard references. In the previous example, access was granted to every user's orders. To grant only the current user's orders, the access control polity may use /a/$ {userId}/orders: (e.g., resulting in /a/Bob/orders 612 being selected).

In one embodiment, the access control system may allow for the specification of a list of possible values for a resource segment. For example, comma-separated values inside a pair of square brackets may be used. For example, the resource /a/[Alice,Cara,Xavier,Yolanda,Zelda] may match two subtrees of example hierarchy 601 (e.g., /a/Alice 610, /a/Alice/orders 616, /a/Cara 614, and /a/Cara/orders 620).

In one embodiment, a resource may include regular expression segments. These may be delimited by a leading r{and a trailing}, for example. In this embodiment, the resource /a/r{Alice|Cara|Xavier|Yolanda|Zelda} may match the same two subtrees of example hierarchy 601 (e.g., /a/Alice 610, /a/Alice/orders 616, /a/Cara 614, and /a/Cara/orders 620).

In one embodiment, a constraint identifies which part of a resource a user may act on. In one embodiment, permissions in the HTTP domain do not have constraints, meaning the user can act on the whole resource (e.g., endpoint, user interface component, etc.). In another embodiment, permissions in the tabular domain do have constraints—each tabular permission has either a column constraint or a row constraint.

In one embodiment, by default, a user is not permitted to read or update any column in a row (or document) in a tabular resource. Column access may be granted through a permission with a column constraints. In a column constraint, the action must be READ or UPDATE (CREATE and DELETE don't apply). The constraint itself may be a string that takes one of the following forms:

| Column Constraint | Notes |
| --- | --- |
| A, b.b1, c | A list of the columns the user is permitted to read (or update). Here the user is granted access to a, b.b1, and c. The dot notation supports nested aggregates in document stores. |
| * | A shorthand name for "all columns." |
| −d, −e. −f.f1 | A shorthand for "all columns except." |

To determine which columns a user had access to in a tabular resource (e.g., 'R'): the access control system may gather all permissions the user holds through any role where: (1) the permission's constraint is a column constraint; (2) the permission's action is the desired operation, e.g., "READ"; and (3) the permission's resource name "matches" R. For example, if R is "/sales/orders/order_item," then each matching permission will have a resource name of "/sales/orders/order_item," "/sales/orders," or "/sales." The access control system may then merge these matching permissions into one, whose column constraint is the combination of the individual column constraints. For example, if one permission grants READ access to fields a, b, and c, while a second grants READ access to a, d, and e, then the combined permission grants READ access to a, b, c, d, and e. If there are no matching permissions, the user is not allowed to read any columns.

The following on-limiting examples demonstrate how two column constraints may be added together

| Column Contraint 1 | Column Contraint 2 | Merged Contraint | Notes |
| --- | --- | --- | --- |
| * | Anything | * | If one column constraint grants all access, it does not matter what the other constraint grants. |
| a, b | b, c | a, b, c | Two grants of explicit columns are unioned. |
| −a, −b | −b, −c | −b | Two "all-but" grants are intersectioned. Here 'b' is the only column not granted in the combined constraint. |
| a | −a | * | One constraint gives access to a single column, and another grants access to all other columns, so all columns are granted. |
| a, b, c | −a, −b, −c | −d, −e | Another example of an explicit list of columns being added to an "all-but" grant. |

In one embodiment, by default a user is not permitted to read or modify any rows (documents) in a tabular resource. Row access may be granted through row constraints. A row constraint may be a serialized Javascript object (aka, map or dictionary). Each key/value pair in the constraint maps a column name to a condition on that column. For instance {foo: 1} grants access to every row (document) whose foo column has the value 1. A row constraint may be analogous to a SQL WHERE clause. For example, to grant the user the right to read rows where the organizationCode column has a particular value, and the customerCode column has another value: {organizationCode: 'ACME', customerCode: '12341234'}. This corresponds to the SQL condition: (organizationCode='ACME' AND customerCode='12341234'). Any client of the access control system making a SQL query on this table must therefore ensure this SQL condition is AND-ed to the WHERE clause.

When determining which rows a user has access to in a particular tabular resource (e.g., 'R'): the access control system gathers all permissions that this user holds through any role where: (1) the permission's resource name "matches" R (for example, if R is "/sales/orders/order_item", then each matching permission will have a resource names of "/sales/orders/order_item," "/sales/orders," or "/sales"); (2) the permission's constraint is a row constraint; and (3) the permission's action is the desired operation, e.g., "READ."

The access control system then tries to merge the matching permissions by coalescing their constraints. For example, if one of the permissions is unconstrained, then all the other permissions can be ignored. If two permissions have identical constraints, one can be discarded. If one constraint is more restrictive than another, it can be discarded. The result is a set of optimized row permissions. If there are no matching permissions, the user may not be allowed to read any rows.

In one example, a tenant has a tabular resource containing rows from many organizations, and it wants to restrict access to those rows based on the user's organization code. A user from organization "a" would only be able to read rows marked with organization code "a", while a user from organization "x" would only be able to read the "x" rows. In one embodiment, the access control system may allow for the definition of a role for each organization. Users in the "OrganizationA" role would have row permission: {organizationCode: 'a'} and users in the "OrganizationX" role would have: {organizationCode: 'x' }. Disadvantageously, this may result in the creation of a large number of roles and permissions. It also may require a lot of administration to ensure that organizational changes are reflected in the access control policy's roles and user assignments. Advantageously, in another embodiment, the policy may be simplified and rendered more efficient by allowing it to reference user-specific attributes such as the organization code. In this embodiment, there may be only one role needed: "OrganizationReader", with the row permission: {organizationCode: organizationCode}. Advantageously, no matter what organization a user moves to, the policy adapts automatically.

In another example, the tenant may want to restrict access to these rows based on the user's organization subtree. A user can see only those rows that belong to their organization or its sub-organizations. Since the access control system maintains the organization hierarchy, it can generate a list of all the organizationCodes rooted at the user's organization. So a permission that authorizes any user to access rows belonging to the user's organization and its sub-organizations may be: {organizationCode: organizationSubtreeCodes}. When the access control system resolves this constraint, it might become: {organizationCode: ["111", "222", "333", "444", "555", "666" ]}, and the corresponding SQL WHERE condition may be: (organizationCode IN ('111', '222', '333', '444', '555', '666')).

In one embodiment, row constraints may be free to leverage more of Javascript's power. For instance, if organization codes are sometimes stored with their proper case intact, and sometimes stored in lower case, this may be captured with the following row constraint: {locationCode: user.location.codes.join('|').toLowerCase( ).split('|')}. In this embodiment, the user may read documents whose location code is any of the user's configured location codes converted to lower case. In another example, if organization codes are sometimes stored with their proper case intact, and sometimes stored in lower case, this may be captured with the following row constraint: {organizationCode: sorted=organizationSubtreeIds.concat(organizationSubtreeIds.join('|').toLowerCase( ).split('|'))}.

Figure 7A:
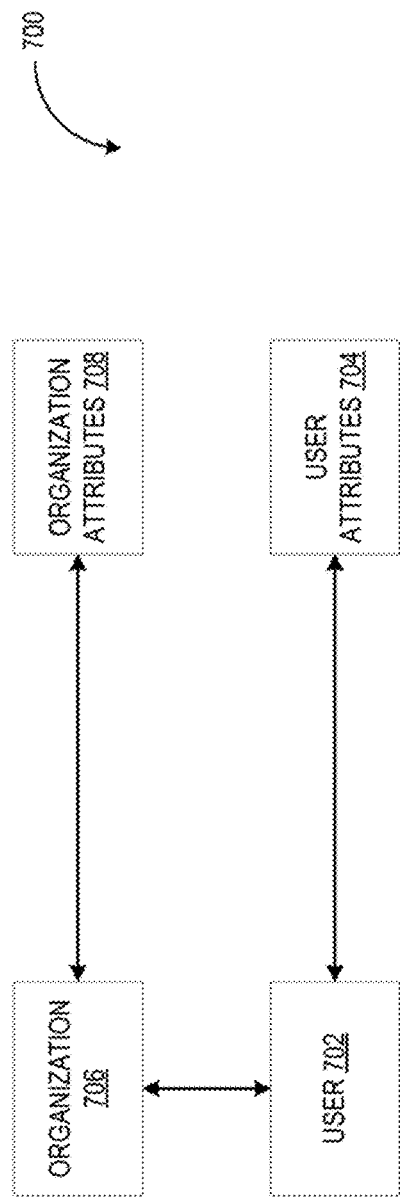
FIG. 7A is a block diagram that illustrates an example auth service user and organization attributes data model, in accordance with some embodiments of the present disclosure.
Figure 7B:
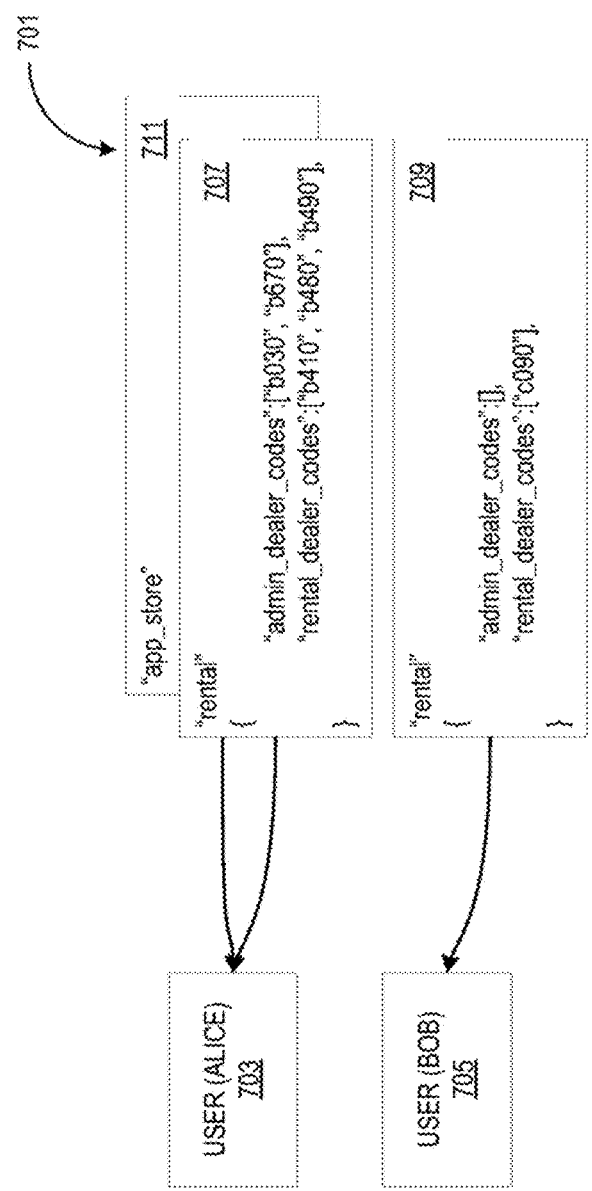
FIG. 7B is a block diagram that illustrates example user attributes, in accordance with some embodiments of the present disclosure.

In one embodiment, attributes in the access control system may have a variety of characteristics. For example, attributes may grouped into three types: (1) standard attributes for the current user and their organization, managed by the access control system; (2) optional named bundles of user attributes, managed by software outside of the access control system (or some component thereof); and (3) optional named bundles of organization attributes, also managed by software external to the access control system (or some component thereof). The following are non-limiting examples of standard attributes:

Optional attributes for the current user and their organization are described with respect to FIGS. 7A and 7B.

FIG. 7A is a block diagram that illustrates an example auth service user and organization attributes data model 700, in accordance with some embodiments of the present disclosure. In one embodiment, the access control service does not need to be the only source of user and organization attributes. Different applications can create their own bundles of attributes. For example, an equipment rental application may need to create user attributes specifying which clients each user is set up to rent from, and which clients each user is allowed to administer. To specify these attributes, the rental application may manage a group of "rental" attributes associated with each user. Likewise, applications can manage groups of attributes at the organization level. These groups may be called namespaces. FIG. 7A shows part of the access control data model extended with a User 702, User Attributes 704, Organization 706, and Organization Attributes 708.

FIG. 7B is a block diagram 701 that illustrates example user attributes, in accordance with some embodiments of the present disclosure. FIG. 7B shows two users (e.g., Alice 703 and Bob 705) with attribute namespaces (e.g., 707 and 709, respectively). The user Bob 705 has a group of attributes in the "rental" namespace 709. Bob is only allowed to rent from the client whose code is "c001," and he is not a rental administrator at any client. Alice 703 also has a group of attributes in the "rental" namespace 707. She is an administrator at two clients, and is also a customer of three other clients. In addition, Alice 703 has a collection of attributes in the "app_store" namespace 711. In one embodiment, each namespace is represented with a JSON object consisting of

| Attribute Name | Sample Value | Meaning |
| --- | --- | --- |
| userId | "278254a0-92e3-4e9b-b7bf-5c04dae52eaa" | An Auth Service UUID uniquely identifying the current user. |
| userCode | "bob@email.example.com" | A unique code identifying the current user. The code may be an email address or some other value assigned by the user's identity provider (IDP). |
| organizationId | "f9d22251-7c9e-490c-aa17-26004e21466d" | The Auth Service UUID for the user organization. |
| organizationCode | "Example" | A code identifying the user's organization. |
| organizationName | "Example Technologies, Inc." | The human oriented name of the user's organization |
| organizationSubtreeCodes | ["Example," "HR," "Engineering,"] | An array containing every organization code found in the organization substree rooted at the user's organization. |
| organizationSubtreeNames | ["Example Technologies, Inc.," . . .] | An array containing every organization name found on the organization subtree rooted at the user's organization. | zero or more attribute name/value pairs. In one embodiment, attribute names are strings and their values can be numbers, strings, lists, and sub-objects.

In one embodiment, standard attributes have simple names like userId or tenantCode and optional attributes have compound names. The first segment may be the user or organization, the second may be the namespace, and the third may be the attribute within the namespace. So, in FIG. 7B, the list of clients the current user can rent from is indicated by user.rental.client_codes.

In one embodiment, a policy is a collection of related permissions. It has been organized, compressed, and optimized so that a Policy Enforcement Point (PEP) can get it from the access control system more quickly, and so that the PEP's questions to it can be answered in a time-effective manner. The access control system may store information about organizations, users, roles, and permissions and can form access control policies out of this data. Policy enforcement may be performed by Policy Enforcement Points (PEPs) (e.g., a service running inside or outside of the access control system). A distributed system may have many PEPs.

In various embodiments, there are two kinds of PEPs for databases. The first type is an Internal PEP: it is part of the database system itself. The second is an External PEP: it is part of the process accessing the database. An internal PEP may require less work to use and may be more difficult to bypass. An external PEP may be harder to write and easier to bypass. External PEPs are described with respect to FIG. 8A and internal PEPs are described with respect to FIG. 8B.

Figure 8A:
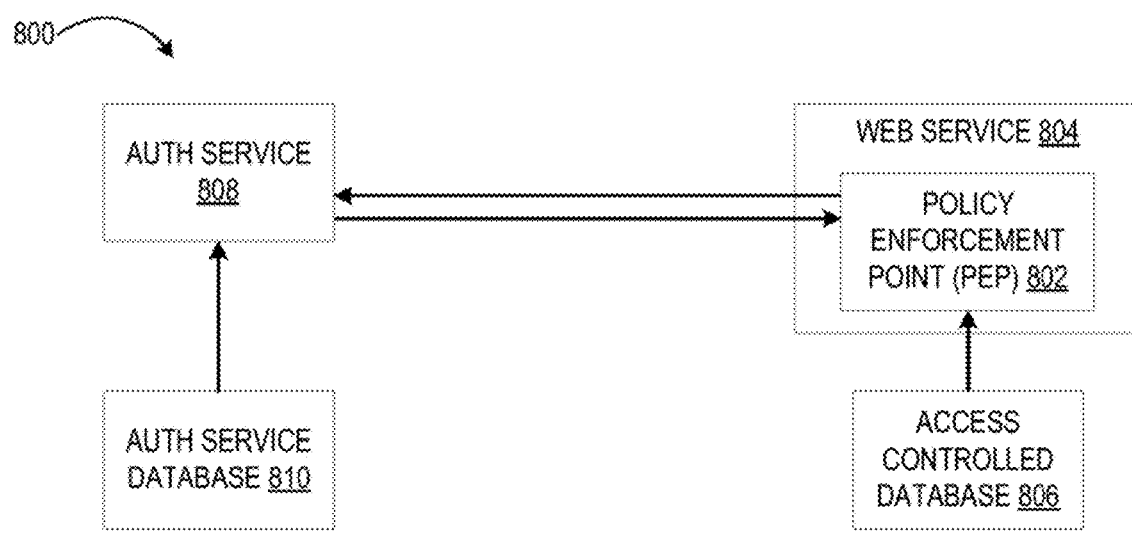
FIG. 8A is a block diagram that illustrates an example external policy enforcement point, in accordance with some embodiments of the present disclosure.

FIG. 8A is a block diagram 800 that illustrates an example external policy enforcement point 802, in accordance with some embodiments of the present disclosure. In the example FIG. 8A, the Web Service 804 wants to make a database read (e.g., from Access Controlled Database 806) request on behalf of the effective user (Bob). In this example, the Web Service 804 requests Bob's access control policy for that database 806 from the Auth Service 808 client library. The client library translates this call into the corresponding Auth Service HTTP request. The Auth Service 808 queries its database 810 for all the relevant permissions, e.g., the ones granted to user Bob, pertaining to the tabular resource "/db/orders," and granting the READ action. The Auth Service 808 compiles the selected permissions into Bob's policy for that resource and action. This compilation may include: collecting the permissions by action and type of constraint; stripping off unnecessary parts of the permissions (e.g., timestamps and UUID); subdividing each set of permissions by the resource they apply to; propagating permissions down the resource tree (e.g., if Bob has a permission for resource /db/orders/a, it also applies to /deb/orders/a/b); and optimizing each set of permissions by striking out duplicates and merging less powerful permissions into more powerful ones.

The Auth Service 808 then serializes the optimized policy into JSON (or XML, YAML, or any other textual or binary representation) and returns it as the response to the Web Service's 804 request. The Web Service 804 gets Bob's access control grants from the Policy, and uses them to restrict queries it makes on the access-controlled database on Bob's behalf. This may involve: modifying the SELECT clause (or No-SQL equivalent) to only read the columns Bob has access to and AND-ing the WHERE clause (or equivalent) with Bob's row constraints.

Figure 8B:
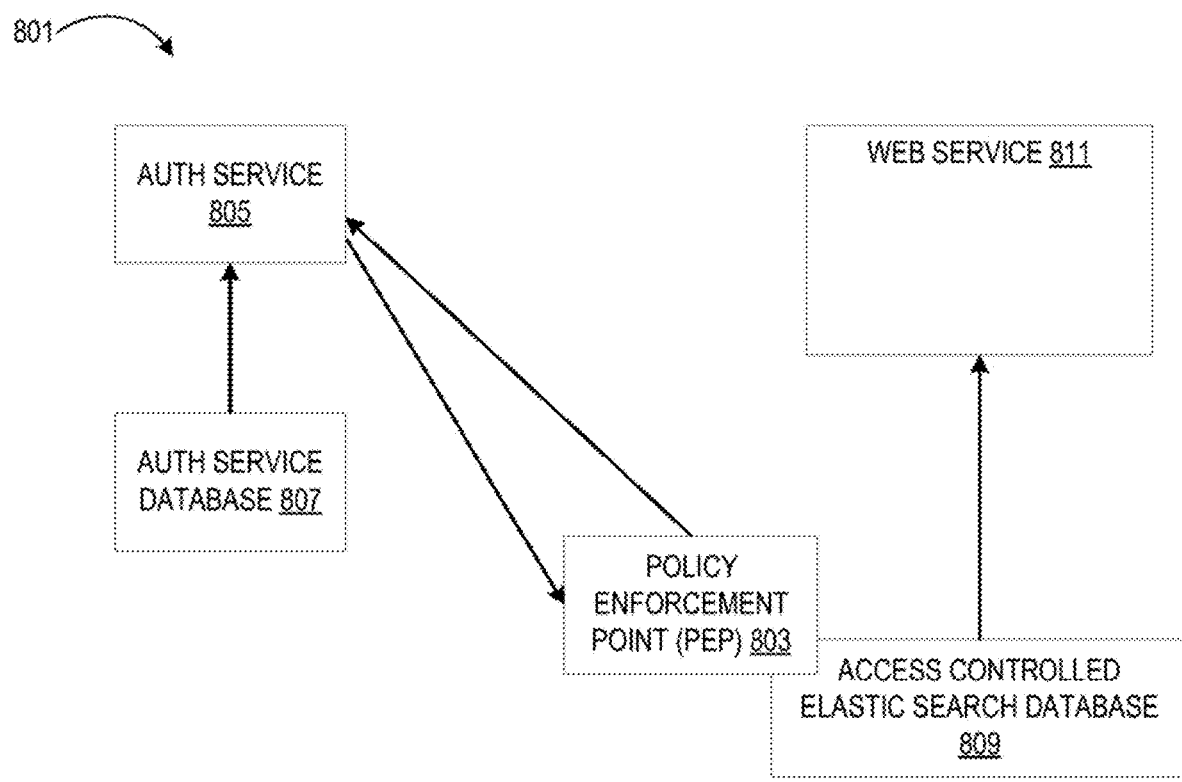
FIG. 8B is a block diagram that illustrates an example internal policy enforcement point, in accordance with some embodiments of the present disclosure.

FIG. 8B is a block diagram 801 that illustrates an example internal policy enforcement point 803, in accordance with some embodiments of the present disclosure. In one embodiment the Auth Service 805 has facilities for mapping user policies into internal PEP 803 policies and transmitting them to the internal PEP 803. In this scenario, the Auth Service 805 runs a batch job periodically to push each user's policy to PEP 803. This batch job iterates over each user and: asks the Auth Service 805 to query its database 807 for all the relevant permissions: the ones granted to that user, pertaining to the tabular resource "/db/es" (809), and granting the READ action (PEP 803 may be read-only); asks the Auth Service 805 to compile the selected permissions the user's policy (as described above); maps the Auth Service 805 policy into an PEP 803 policy and sends that policy to PEP 803. When the Web Service 811 makes a query on PEP 803 it needs to identify the effective user via a header on the query request. PEP 803 enforces the policy.

In one embodiment, an Auth Service 805 policy is an outer map (e.g., Javascript Object)" whose attributes have maps as their values. The outer map may have keys that indicate the action and the constraint type. The following example shows two keys, both pertaining to READ actions:

```
[ 'READ_ROW':
    [ '/db/orders/a': [ {orgCode:'IL99'} ],
        '/db/orders/a/b': [ {orgCode:['IL01','IL02','IL03','IL99']}
        ] }
    'READ_COLUMN':
    [ 'db/orders/a': [ '-commission,-price' ],
        '/db/orders/a/b': [ '*' ] }
}
```

The first key gathers all the row constraints for READs while the second gathers all the column constraints. Each group of constraints is organized with an inner map. The inner map's keys are resource names, and the values are the lists of constraints to apply on each resource name. In the above example, there are two READ_ROW constraints. The first says that throughout the resource subtree rooted at /db/orders/a the user may read any row (e.g., document) whose orgCode field is 'IL99'. The second says that in the smaller subtree rooted at /db/orders/a/b the user may read any row whose orgCode is either 'IL01' or 'IL99'. Likewise there are two READ_COLUMN constraints: at /db/orders/a the user can read any field except commission and price, while at /db/orders/b the user can read any field period.

When looking up permissions in a policy, the search may start at the deepest resource level (e.g., /db/orders/a/b/c) and then see if there are any constraints at that level. If not, the search continues looking for the next higher level (/db/orders/a/b), and so on until constraints are found or the topmost level of the resource is reached without finding constraints for it. In one embodiment, the search for row constraints and the search for column constraints may be conducted independently.

Figure 9:
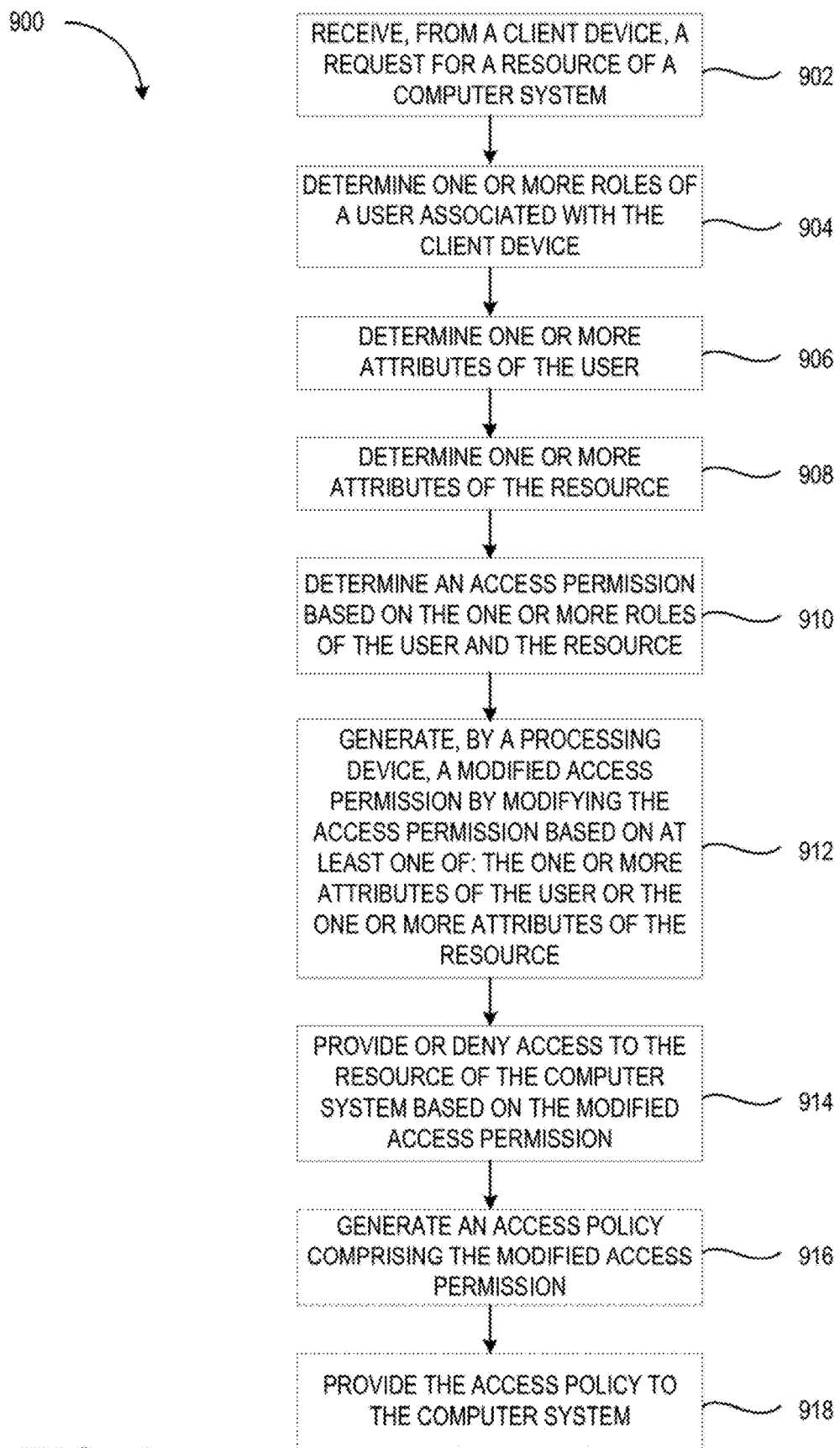
FIG. 9 is a flow diagram of a method of hybrid access control, in accordance with some embodiments.

FIG. 9 is a flow diagram of a method 900 of hybrid access control, in accordance with some embodiments. The method 900 may be performed by processing logic that comprises hardware (e.g., circuitry, dedicated logic, programmable logic, microcode, etc.), software (e.g., instructions run on a processing device to perform hardware simulation), or a combination thereof.

Referring to FIG. 9, at block 902 processing logic receives, from a client device, a request for a resource of a computer system. In one embodiment, the request for the resource includes a resource path. In another embodiment, the resource path includes at least one of: a variable or a textual pattern. At block 904, processing logic determines one or more roles of a user associated with the client device, at block 906, processing logic determines one or more attributes of the user, and at block 908, processing logic determines one or more attributes of the resource. In one embodiment, the one or more attributes of the user and the one or more attributes of the resource correspond to one or more key value pairs.

In one embodiment, at block 910, processing logic determines an access permission based on the one or more roles of the user and the resource. At block 912, processing logic generates, by a processing device, a modified access permission by modifying the access permission based on at least one of: the one or more attributes of the user or the one or more attributes of the resource. In one embodiment, the modified access permission identifies a resource expression and an action. In another embodiment, the modified access permission identifies a constraint, which limits access to a subpart of the resource. In one embodiment, the constraint includes at least one of: a variable or a textual pattern.

At block 914, processing logic provides or denies access to the resource of the computer system based on the modified access permission. For example, if it is determined based on the modified access permission that the user is authorized to access the resource, processing logic will provide the access. If it is determined based on the modified access permission that the user is not authorized to access the resource, processing logic will deny the access.

Optionally, at block 916, processing logic generates an access policy comprising the modified access permission, and, at block 918, processing logic provides the access policy to the computer system.

Figure 10:
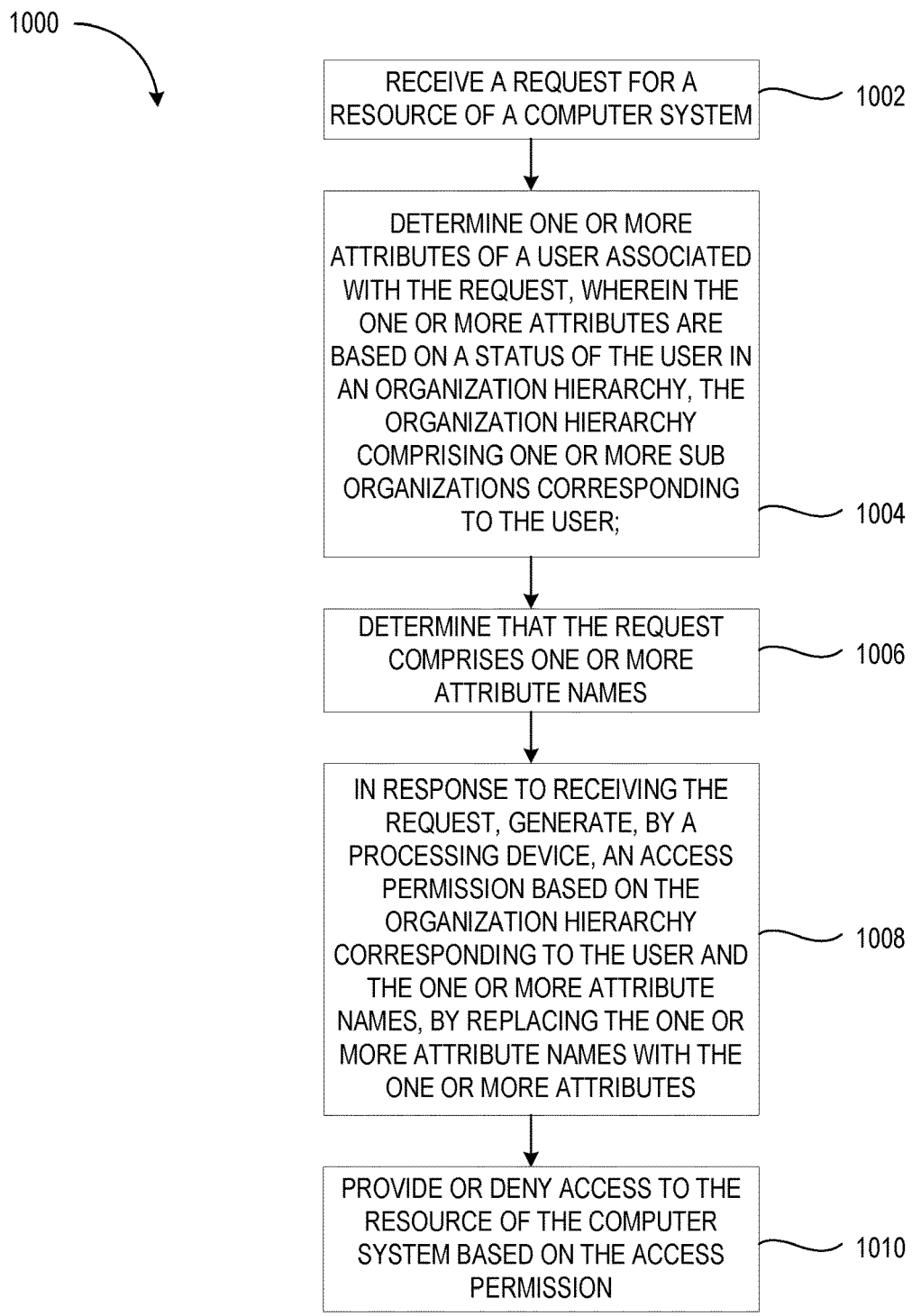
FIG. 10 is a flow diagram of a method of organization based access control, in accordance with some embodiments.

FIG. 10 is a flow diagram of a method 1000 of organization-based access control, in accordance with some embodiments. The method 1000 may be performed by processing logic that comprises hardware (e.g., circuitry, dedicated logic, programmable logic, microcode, etc.), software (e.g., instructions run on a processing device to perform hardware simulation), or a combination thereof.

Referring to FIG. 10, at block 1002 processing logic receives a request for a resource of a computer system. In one embodiment, the request is received from a client device of the computer system. In another embodiment, the request is received from a client device external to the computer system. The request may include a resource path, and wherein the resource path comprises at least one of: a variable or a textual pattern, as described herein.

At block 1004, processing logic determines one or more attributes of a user associated with the request, wherein the one or more attributes are based on a status of the user in an organization hierarchy, the organization hierarchy comprising one or more sub organizations corresponding to the user. In one embodiment, the one or more attributes are not roles in the access control system. The one or more attributes based on the status of the user in an organization hierarchy may be a separate and distinct classification of organization-based attributes, compared to other attributes of the access control system. In one embodiment, the organization hierarchy is represented by a tree-type data structure. In another embodiment, the organization hierarchy is represented by a directed acyclic graph data structure. In a variety of other embodiments, the organization hierarchy may be any other data structure capable of describing the organization hierarchy.

At block 1006, processing logic determines that the request comprises one or more attribute names. In one embodiment, attribute names may be a string of text (e.g., a variable, expression, pattern, etc.) that represents a classification of attribute to be inserted into a resource path of the request, as described herein. In one embodiment, the request for the resource includes a resource path. In one embodiment, the resource path includes at least one of: a variable or a textual pattern, as described herein.

At block 1008, in response to receiving the request, processing logic generates, by a processing device, an access permission based on the organization hierarchy corresponding to the user and the one or more attribute names. In one embodiment, processing logic generates the access permission by replacing the one or more attribute names with the one or more attributes. The access permission may identify a resource expression, an action, and a constraint, wherein the constraint limits access to a subpart of the resource.

At block 1010, processing logic provides or denies access to the resource of the computer system based on the access permission. Optionally, processing logic may generate an access policy comprising the access permission and provide the access policy to the computer system. It should be noted that the above operations may be performed in conjunction with a hybrid role and attribute-based access control system, a strictly access based control system, or any other access control system that allows for the distinct definition of organizational attributes.

Figure 11:
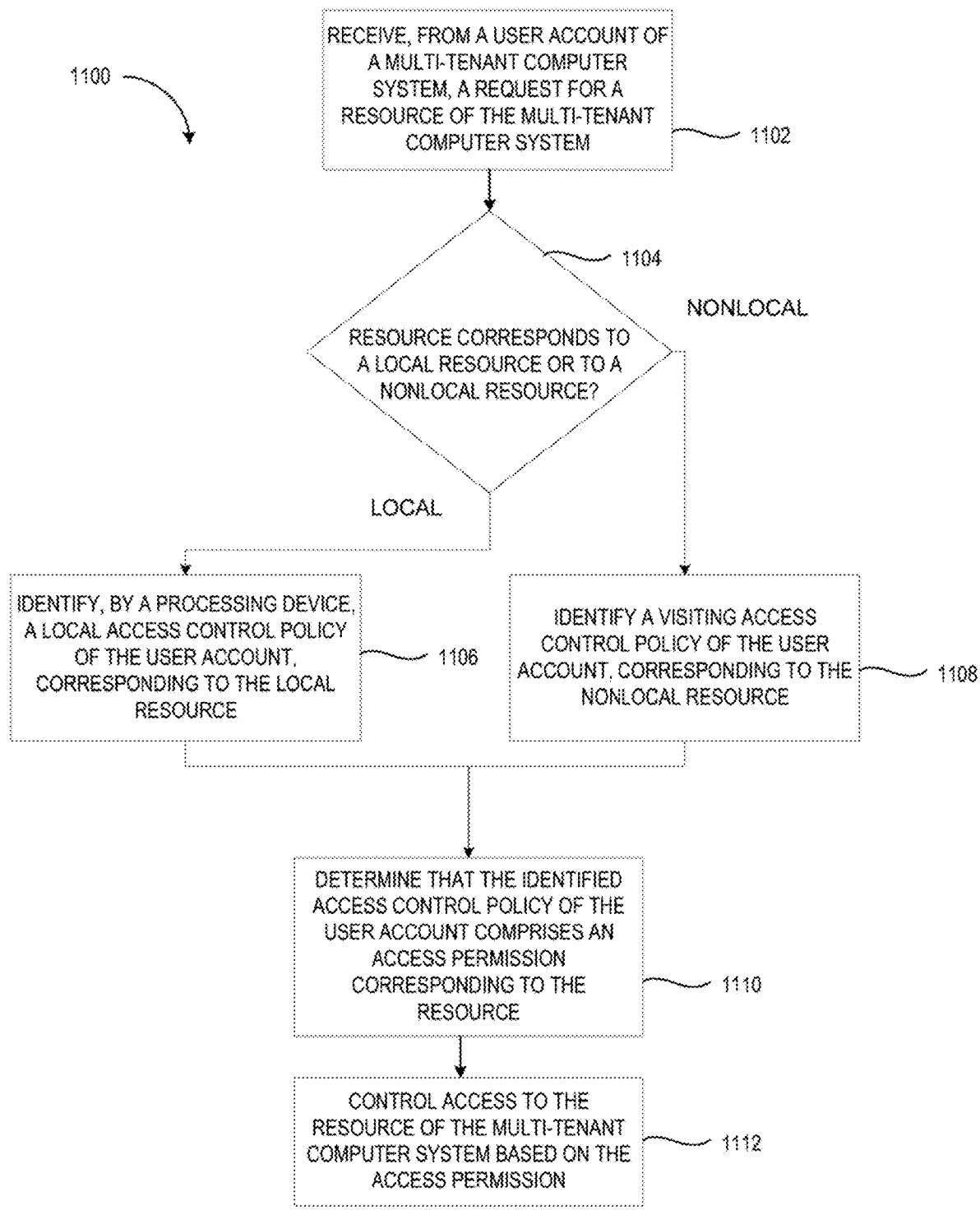
FIG. 11 is a flow diagram of a method of multi-tenant authorization, in accordance with some embodiments.

FIG. 11 is a flow diagram of a method of multi-tenant authorization, in accordance with some embodiments. The method 1100 may be performed by processing logic that comprises hardware (e.g., circuitry, dedicated logic, programmable logic, microcode, etc.), software (e.g., instructions run on a processing device to perform hardware simulation), or a combination thereof.

Referring to FIG. 11, at block 1102 processing logic receives, from a user account of a multi-tenant computer system, a request for a resource of the multi-tenant computer system. In one embodiment, the request may identify the resource, as well as a location of the resource and/or action to be performed on the resource. In other embodiments, other suitable information may be included and/or identified in the request. In one embodiment, the user account may be a root tenant account of the multi-tenant computer system. A root tenant account may be a platform-level account capable of performing platform-level activities. For example, various employees of a company maintaining a multi-tenant computer system may have root tenant accounts to perform various maintenance and development activities on the system. In such a case, some root tenant accounts may be capable of performing both platform-level activities as well as authorized tenant-level activities on behalf of other tenants of the multi-tenant compute system. In various embodiments, user accounts may be human-backed accounts that allow the user to perform authorized activities or service accounts that perform compute processes on behalf of the platform and/or tenant. For example, in one embodiment the user account of the multi-tenant computer system (block 1102) is a service account of the multi-tenant computer system, corresponding to one or more compute processes executed on behalf of the multi-tenant computer system.

In another embodiment, the user account is a non-root tenant account of the multi-tenant computer system. A non-root tenant account may have access to the specific tenant(s) to which it is assigned, and it may not have access to perform any platform-level activities.

At block 1104, processing logic may determine whether the resource corresponds to a local resource that is in a first tenant associated with the user (i.e., local to the Tenant the user account belongs to), or to a nonlocal resource that is in a second tenant not associated with the user (i.e., not local to the Tenant the user account belongs to; e.g., the locality of resources may be determined relative to the requesting user account). In other words, "local resource" and "nonlocal resource" may refer to whether or not that resource belongs to the same tenant as the requesting User.

In one embodiment, if the user account is a root tenant account, platform-level resources (and activities using resources) may be local to the user account, while tenant-level resources (and activities) may be nonlocal. In another embodiment, if the user account is a non-root tenant account, platform-level resources (and activities using resources) and tenant-level resources (and activities) corresponding to a different tenant may be nonlocal to the user account, while tenant-level resources (and activities) that are specific to the tenant may be local.

At block 1106, if the requested resource is local, processing logic may identify, by a processing device, a local access control policy of the user account, corresponding to the local resource. In one embodiment, the local access control policy includes one or more access permissions corresponding to actions or resources of the multi-tenant computer system. If the requested resource is nonlocal, processing logic may identify a visiting access control policy of the user account, corresponding to the nonlocal resource (1108). The visiting access control policy may include one or more access permissions corresponding to actions or resources of one or more tenants of the multi-tenant computer system.

In various embodiments, visiting (and/or local) access control policies may include a first set of access permissions corresponding to a first tenant and a second set of access permissions corresponding to a second tenant, wherein the first set of access permissions and the second set of access permissions are distinct. In other words, access control policies may be configured to have any level of access granularity. In other embodiments, user accounts may have more than one visiting access control policy (and/or local access control policy), one for each tenant (e.g., an access control policy may be unique to a specific tenant). In one embodiment, user accounts of the multi-tenant compute system have both one or more local access control policies and one or more visiting access control policies. In other embodiments, user accounts may have one or the other.

In one embodiment, access control policies may inherit elements (e.g., access permissions from other access control policies. For example, if a user account includes both a local access control policy and a visiting access control policy, the visiting access control policy may inherit one or more permissions from the local access control policy, and vice versa. In one embodiment, elements of an access control policy may only be inherited from another access control policy of the same user account. In other embodiments, elements of access control policies may be inherited form other access control policies, not belonging to the same user (e.g., belonging to the same organization, user group, etc.). As described herein, access control policies may correspond to a layered access control system, such as a hybrid role and attribute-based access control system or an organization based access control system, or a flat access control system.

At block 1110, processing logic determines that the identified access control policy (e.g., either local or visiting, identified in block 1106 or 1108) of the user account includes an access permission corresponding to the resource. At block 1112, processing logic controls (e.g., provides or denies) access to the resource of the multi-tenant computer system based on the access permission. For example, if the access permission grants access to the resource (and the specific action to be performed on the resource), access may be granted. Otherwise (or if an access permission does not exist for the resource), access may be denied. In one embodiment, the visiting access control policy or the local access control policy is enforced by a plurality of policy enforcement points (e.g., one restricting access to web service endpoints, another limiting user interface operations, a third limiting access to a database system, etc.). In another embodiment, the visiting access control policy or the local access control policy may be enforced by a single policy enforcement point.

Figure 12:
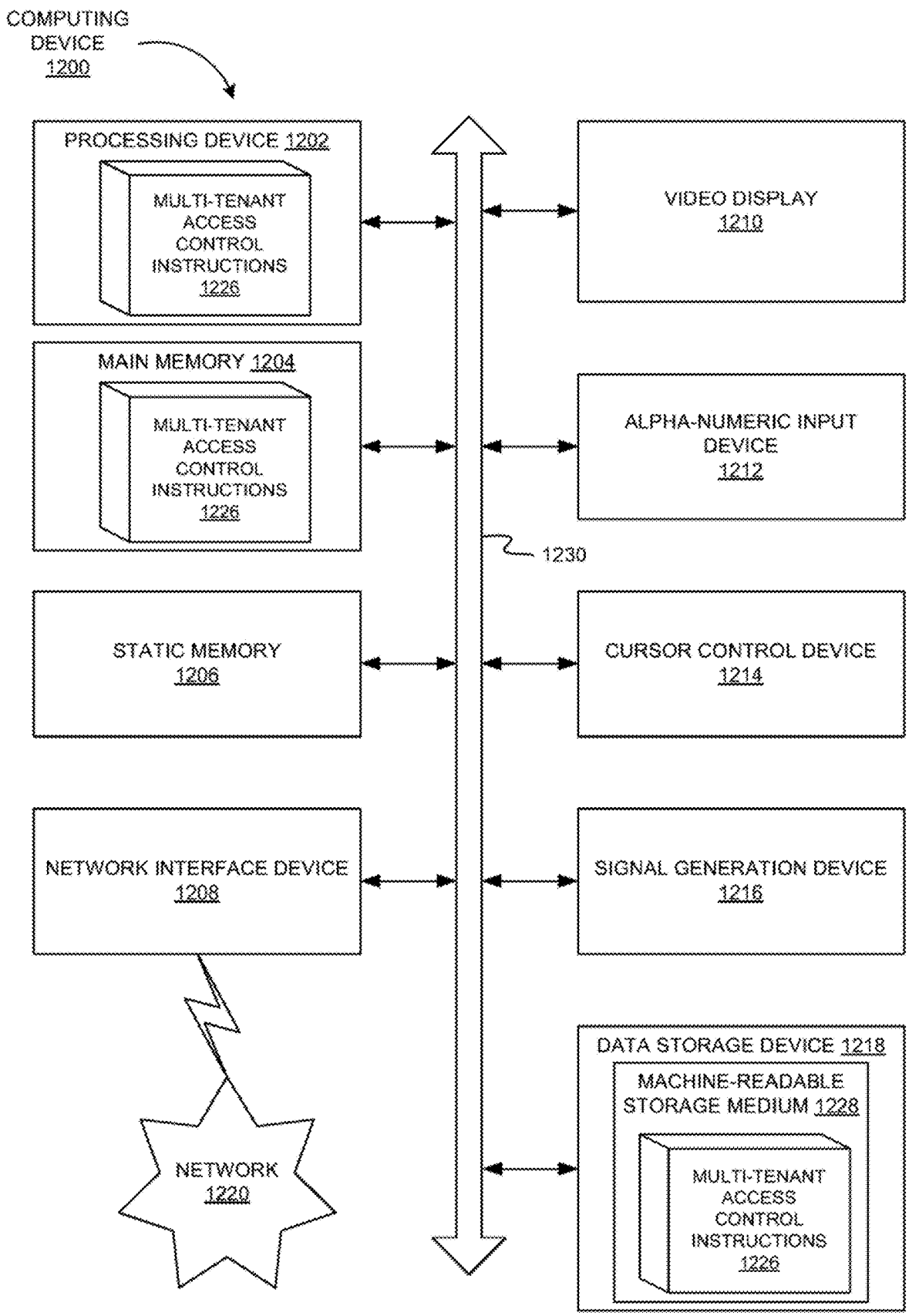
FIG. 12 is a block diagram of an example computing device that may perform one or more of the operations described herein, in accordance with some embodiments of the present disclosure.

FIG. 12 is a block diagram of an example computing device 1200 that may perform one or more of the operations described herein, in accordance with some embodiments. Computing device 1200 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1200 may include a processing device (e.g., a general-purpose processor, a PLD, etc.) 1202, a main memory 1204 (e.g., synchronous dynamic random access memory (DRAM), read-only memory (ROM)), a static memory 1206 (e.g., flash memory and a data storage device 1218), which may communicate with each other via a bus 1230.

Processing device 1202 may be provided by one or more general-purpose processing devices such as a microprocessor, central processing unit, or the like. In an illustrative example, processing device 1202 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1202 may also comprise one or more special-purpose processing devices such as an application specific integrated circuit (ASIC), a field programmable gate array (FPGA), a digital signal processor (DSP), network processor, or the like. The processing device 1202 may be configured to execute the operations described herein, in accordance with one or more aspects of the present disclosure, for performing the operations and steps discussed herein.

Computing device 1200 may further include a network interface device 1208 which may communicate with a network 1220. The computing device 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse) and an acoustic signal generation device 1216 (e.g., a speaker). In one embodiment, video display unit 1210, alphanumeric input device 1212, and cursor control device 1214 may be combined into a single component or device (e.g., an LCD touch screen).

Data storage device 1218 may include a computer-readable storage medium 1228 on which may be stored one or more sets of instructions, e.g., multi-tenant access control instructions 1226 to carry out the operations described herein, in accordance with one or more aspects of the present disclosure. Multi-tenant access control instructions 1226 implementing access control components, etc., may also reside, completely or at least partially, within main memory 1204 and/or within processing device 1202 during execution thereof by computing device 1200, main memory 1204 and processing device 1202 also constituting computer-readable media. The multi-tenant access control instructions 1226 may further be transmitted or received over a network 1220 via network interface device 1208.

While computer-readable storage medium 1228 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "determining," "identifying," "storing," "calculating," "requesting," "allowing." "preventing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the disclosure is not to be limited to the details given herein, but may be modified within the scope and equivalents of the appended claims.

What is claimed is:

1. A computer-implemented method comprising:
   receiving, at a multi-tenant computer system from a client device associated with a user account of the multi-tenant computer system, a request for the user account to access a given resource of the multi-tenant computer system, wherein the user account only belongs to a first tenant of the multi-tenant computer system;
   determining whether the given resource a) belongs to the first tenant to which the user account belongs such that the given resource is a local resource for the user account or (ii) belongs to a second tenant of the multi-tenant computer system that differs from the first tenant to which the user account belongs such that the given resource is a nonlocal resource for the user account;
   based on the determining, identifying an access control policy of the user account that comprises either (i) a local access control policy of the user account if it is determined that the given resource belongs to the first tenant such that it is a local resource, or (ii) a visiting access control policy of the user account if it is determined that the given resource belongs to the second tenant such that it is a nonlocal resource for the user account, wherein the local access control policy of the user account differs from the visiting access control policy of the user account;
   determining that the identified access control policy of the user account includes an access permission that is applicable to the given resource; and
   controlling access to the given resource of the multi-tenant computer system based on the access permission.

2. The computer-implemented method of claim 1, wherein the user account corresponds to both the local access control policy and the visiting access control policy.

3. The computer-implemented method of claim 1, wherein the visiting access control policy shares one or more permissions with the local access control policy.

4. The computer-implemented method of claim 1, wherein the visiting access control policy of the user account that is identified if it is determined that the given resource belongs to the second tenant comprises a visiting access control policy of the user account that is unique to the second tenant.

5. The computer-implemented method of claim 1, wherein the user account belonging to the first tenant is a user account of a root tenant that is responsible for performing platform-level activities for the multi-tenant computer system.

6. The computer-implemented method of claim 5, wherein the request for the user account to access the given resource of the multi-tenant computer system comprises a request for the user account to perform a tenant-level activity on a given resource belonging to a non-root tenant of the multi-tenant computer system.

7. The computer-implemented method of claim 5, wherein the visiting access control policy of the user account is defined in the root tenant.

8. The computer-implemented method of claim 1, wherein the user account belonging to the first tenant is a user account of a non-root tenant that is not responsible for performing any platform-level activities for the multi-tenant computer system.

9. The computer-implemented method of claim 1, wherein the access control policy corresponds to one of: a hybrid role and attribute-based access control system, a role-based access control system, an attribute-based access control system, or an organization-based access control system.

10. The computer-implemented method of claim 1, wherein the user account belonging to the first tenant is a service account of the multi-tenant computer system that is responsible for executing one or more compute processes on behalf of the multi-tenant computer system.

11. The computer-implemented method of claim 1, wherein the identified access control policy of the user account is enforced by a plurality of policy enforcement points.

12. A multi-tenant computer system comprising:
   a network interface;
   at least one processor; and
   at least one computer-readable storage medium comprising program instructions that are executable by the at least one processor such that the multi-tenant computer system is configured to:
      receive, at a multi-tenant computer system from a client device associated with a user account of the multi-tenant computer system, a request for the user account to access a given resource of the multi-tenant computer system, wherein the user account only belongs to a first tenant of the multi-tenant computer system;
      determine whether the given resource (i) belongs to the first tenant to which the user account belongs such that the given resource is a local resource for the user account or (ii) belongs to a second tenant of the multi-tenant computer system that differs from the first tenant to which the user account belongs such that the given resource is a nonlocal resource for the user account;
      based on the determining, identify an access control policy of the user account that comprises either (i) a local access control policy of the user account if it is determined that the given resource belongs to the first tenant such that it is a local resource, or (ii) a visiting access control policy of the user account if it is determined that the given resource belongs to the second tenant such that it is a nonlocal resource for the user account, wherein the local access control policy of the user account differs from the visiting access control policy of the user account;
      determine that the identified access control policy of the user account includes an access permission that is applicable to the given resource; and
      control access to the given resource of the multi-tenant computer system based on the access permission.

13. The multi-tenant computer system of claim 12, wherein the user account corresponds to both the local access control policy and the visiting access control policy.

14. The multi-tenant computer system of claim 12, wherein the visiting access control policy shares one or more permissions with the local access control policy.

15. The multi-tenant computer system of claim 12, wherein the visiting access control policy of the user account that is identified if it is determined that the given resource belongs to the second tenant comprises a visiting access control policy of the user account that is unique to the second tenant.

16. The multi-tenant computer system of claim 12, wherein the user account belonging to the first tenant is a user account of a root tenant that is responsible for performing platform-level activities for the multi-tenant computer system.

17. The multi-tenant computer system of claim 16, wherein the request for the user account to access the given resource of the multi-tenant computer system comprises a request for the user account to perform a tenant-level activity on a given resource belonging to a non-root tenant of the multi-tenant computer system.

18. The multi-tenant computer system of claim 12, wherein the access control policy corresponds to one of: a hybrid role and attribute-based access control system, a role-based access control system, an attribute-based access control system, or an organization-based access control system.

19. The multi-tenant computer system of claim 12, wherein the user account belonging to the first tenant is a service account of the multi-tenant computer system that is responsible for executing one or more compute processes on behalf of the multi-tenant computer system.

20. A non-transitory computer readable medium comprising instructions that, when executed by at least one processor of a multi-tenant computer system, cause the multi-tenant computer system to:

receive, at a multi-tenant computer system from a client device associated with a user account of the multi-tenant computer system, a request for the user account to access a given resource of the multi-tenant computer system, wherein the user account only belongs to a first tenant of the multi-tenant computer system;

determine whether the given resource (i) belongs to the first tenant to which the user account belongs such that the given resource is a local resource for the user account or (ii) belongs to a second tenant of the multi-tenant computer system that differs from the first tenant to which the user account belongs such that the given resource is a nonlocal resource for the user account;

based on the determining, identify an access control policy of the user account that comprises either (i) a local access control policy of the user account if it is determined that the given resource belongs to the first tenant such that it is a local resource, or (ii) a visiting access control policy of the user account if it is determined that the given resource belongs to the second tenant such that it is a nonlocal resource for the user account, wherein the local access control policy of the user account differs from the visiting access control policy of the user account;

determine that the identified access control policy of the user account includes an access permission that is applicable to the given resource; and control access to the given resource of the multi-tenant computer system based on the access permission.

\* \* \* \* \*